(12) United States Patent
Lau et al.

(10) Patent No.: US 10,648,953 B1
(45) Date of Patent: May 12, 2020

(54) ULTRASONIC WELD QUALITY TESTING USING AUDIO

(71) Applicant: Wisk Aero LLC, Mountain View, CA (US)

(72) Inventors: Sampson Lau, Mountain View, CA (US); Nihal Murthy, San Francisco, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 16/025,841

(22) Filed: Jul. 2, 2018

(51) Int. Cl.
*G01N 29/48* (2006.01)
*G01N 29/04* (2006.01)
*B23K 20/10* (2006.01)
*H01M 2/20* (2006.01)
*G01N 29/44* (2006.01)

(52) U.S. Cl.
CPC .............. *G01N 29/48* (2013.01); *B23K 20/10* (2013.01); *G01N 29/041* (2013.01); *G01N 29/4427* (2013.01); *H01M 2/202* (2013.01); *G01N 2291/267* (2013.01)

(58) Field of Classification Search
CPC .. G01N 29/48; G01N 29/4427; G01N 29/041; G01N 2291/267; H01M 2/202; B23K 20/10
See application file for complete search history.

(56) References Cited

U.S. PATENT DOCUMENTS

2005/0151083 A1*   7/2005   Favro ................... G01N 3/60
                                                                250/341.6
2013/0105556 A1*   5/2013   Abell ............... G05B 23/0221
                                                                228/1.1

* cited by examiner

*Primary Examiner* — Xin Y Zhong
(74) *Attorney, Agent, or Firm* — Kilpatrick Townsend & Stockton LLP

(57) ABSTRACT

Various embodiments of a technique are provided for determining the quality of a weld for a battery contact using audio signals. In some embodiments, a system for determining the quality of a weld for a battery contact comprises a processor configured to receive a snapshot that includes a rendering of an audio signal obtained during a welding process by monitoring a device being welded. A weld-quality indicator for the device being welded is determined based at least in part on features extracted from the snapshot and a weld-quality score for the device being welded is determined in response to the weld-quality indicator. In this case, the weld-quality score is indicative of a quality of the weld. The system also includes a memory coupled to the processor and configured to provide the processor with instructions.

21 Claims, 18 Drawing Sheets

ULTRASONIC WELD QUALITY TESTING USING AUDIO

BACKGROUND OF THE INVENTION

Existing approaches for testing weld-quality include high current testing performed after the weld process that destroys the weld being tested. Accordingly, a technique that provides an ability for in-process inspection using a non-destructive weld-quality test for determining whether process quality has degraded would provide various advantages over existing techniques.

One application is to non-destructive, in-line, simultaneous process testing of battery contact welds during a battery build process. In this case, a non-destructive weld-quality test may be used to provide a faster, more efficient, and cost-effective approach for producing better quality battery cells compared to other production processes. This provides a benefit in that failed welds can be identified at an early stage before investing additional process time for reworking them.

BRIEF DESCRIPTION OF THE DRAWINGS

Various embodiments of the invention are disclosed in the following detailed description and the accompanying drawings.

DETAILED DESCRIPTION

Figure 1:
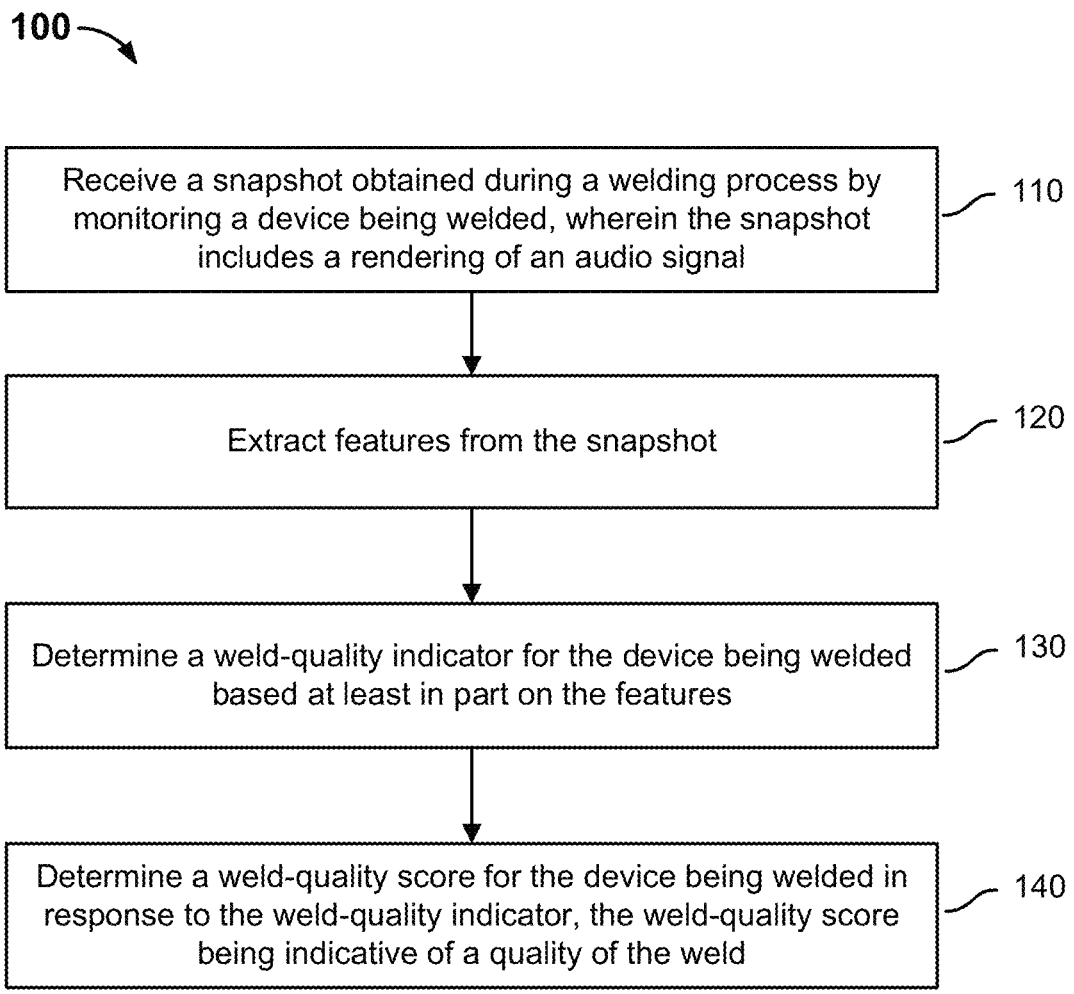
FIG. 1 is a flowchart illustrating an embodiment of a process to determine the quality of a weld for a battery contact using audio signals.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique are provided for determining the quality of a weld for a battery contact using audio signals. In some embodiments, a system for determining the quality of a weld for a battery contact comprises a processor configured to receive a snapshot that includes a rendering of an audio signal obtained during a welding process by monitoring a device being welded. A weld-quality indicator for the device being welded is determined based at least in part on features extracted from the snapshot and a weld-quality score for the device being welded is determined in response to the weld-quality indicator. In this case, the weld-quality score is indicative of a quality of the weld. The system also includes a memory coupled to the processor and configured to provide the processor with instructions.

In some examples, the device being welded comprises a battery contact and the welding process is performed by an ultrasonic welder having an excitation frequency. In some cases, the device being welded comprises an aluminum tab connected to a battery cell and a copper bus bar and the welding process is performed by an ultrasonic welder having an excitation frequency, wherein the welder is used to weld the aluminum tab to the copper bus bar. In these cases, weld-quality indicator for the device indicates a quality of a weld between the aluminum tab and the copper bus bar. In some cases, the features extracted from the snapshot include a plurality of peak amplitudes corresponding to a plurality of peaks appearing at a set of frequencies at a time T1. Additionally or in the alternative, the features extracted from the snapshot include a plurality of peak amplitude differences corresponding to a difference in amplitude between an excitation peak amplitude and each of a plurality of peaks appearing at a set of frequencies at a time T1. In some embodiments, the set of frequencies includes odd harmonics of half of the excitation frequency of the ultrasonic welder.

FIG. 1 is a flowchart illustrating an embodiment of a process 100 to determine the quality of a weld for a battery contact using audio signals. In some applications, this technique is used for in-process inspection to provide a non-destructive weld-quality test. For instance, the technique is applied for implementing non-destructive testing to evaluate (e.g., a pass/fail test) the weld-quality of welds for a battery contact made between aluminum tabs to copper bus wires. In this exemplary non-destructive weld-quality testing applications, an ultrasonic welder is used to weld aluminum tabs of battery cells to copper bus wires and sounds produced by the welder during the welding process are captured and recorded using an (e.g., ultrasonic) microphone.

Returning to the embodiment of a process 100 as depicted in FIG. 1, at 110, a snapshot obtained during a welding process by monitoring a device being welded is received, wherein the snapshot includes a rendering of an audio signal. In some cases, the device being welded is monitored with a microphone that generates audio signals and a snapshot or a plurality of snapshots are obtained from the microphone.

At 120, features are extracted from the snapshot and at 130, a weld-quality indicator for the device being welded is determined based at least in part on the features. For example, as will be described in more detail below, in embodiments the features extracted at 120 relate to peaks in a frequency-domain snapshot.

In some cases, audio signals generated by a microphone are captured by a snapshot (e.g., associated with a single discrete point in time, such as Ti) or a plurality of snapshots (e.g., where each snapshot is associated with a different discrete point in time). In some of the examples shown, the snapshot is a spectrogram of an ultrasonic recording, which can be processed or analyzed to extract various features based on or in response to an amplitude or intensity of the audio signal as a function of frequency.

The technique disclosed herein thus provides various advantages over destructive testing processes. For example, testing for mechanical strength of a weld (e.g., to determine the weld's ability to survive shocks and vibrations expected during use of the device being welded) can include pulling on the welds directly, which damages or destroys even a good weld. The disclosed technique can be used in-line and non-destructively on every device or unit being welded. In particular, the disclosed technique provides an ability for non-destructive, in-line, simultaneous process testing during a battery build process. Accordingly, the disclosed technique may be used to provide a faster, more efficient, and cost-effective approach for producing better quality battery cells compared to other production processes in that failed welds are identified at an early stage before investing additional process time and resources for reworking them.

At 140, a weld-quality score for the device being welded is determined in response to the weld-quality indicator, the weld-quality score being indicative of a quality of the weld. For example, this process may be part of a pass/fail test which evaluates the quality of the weld. The weld-quality score may be compared against a threshold (e.g., corresponding to an acceptable weld quality) and the part may be rejected or pass the test depending upon the comparison. In some embodiments, the (e.g., testing and/or sorting) process described in FIG. 1 is performed simultaneously while the welding occurs. This process may be desirable because the part does not need to be moved into a separate testing enclosure or device and/or can occur substantially simultaneously as the welding, therefore making the testing process faster. The process is also non-destructive, so a device does not need to be sacrificed to the testing process.

It may be helpful to describe the process of FIG. 1 in the context of a more specific example. The following figure describes an example where aluminum tabs from battery cells are welded to a copper bus bar. Although the process below discusses a specific system which includes an aluminum tab from a battery cell being welded to a copper bus bar, in some embodiments, the process is performed on some other device (e.g., with some other things being welded together).

Figure 2:
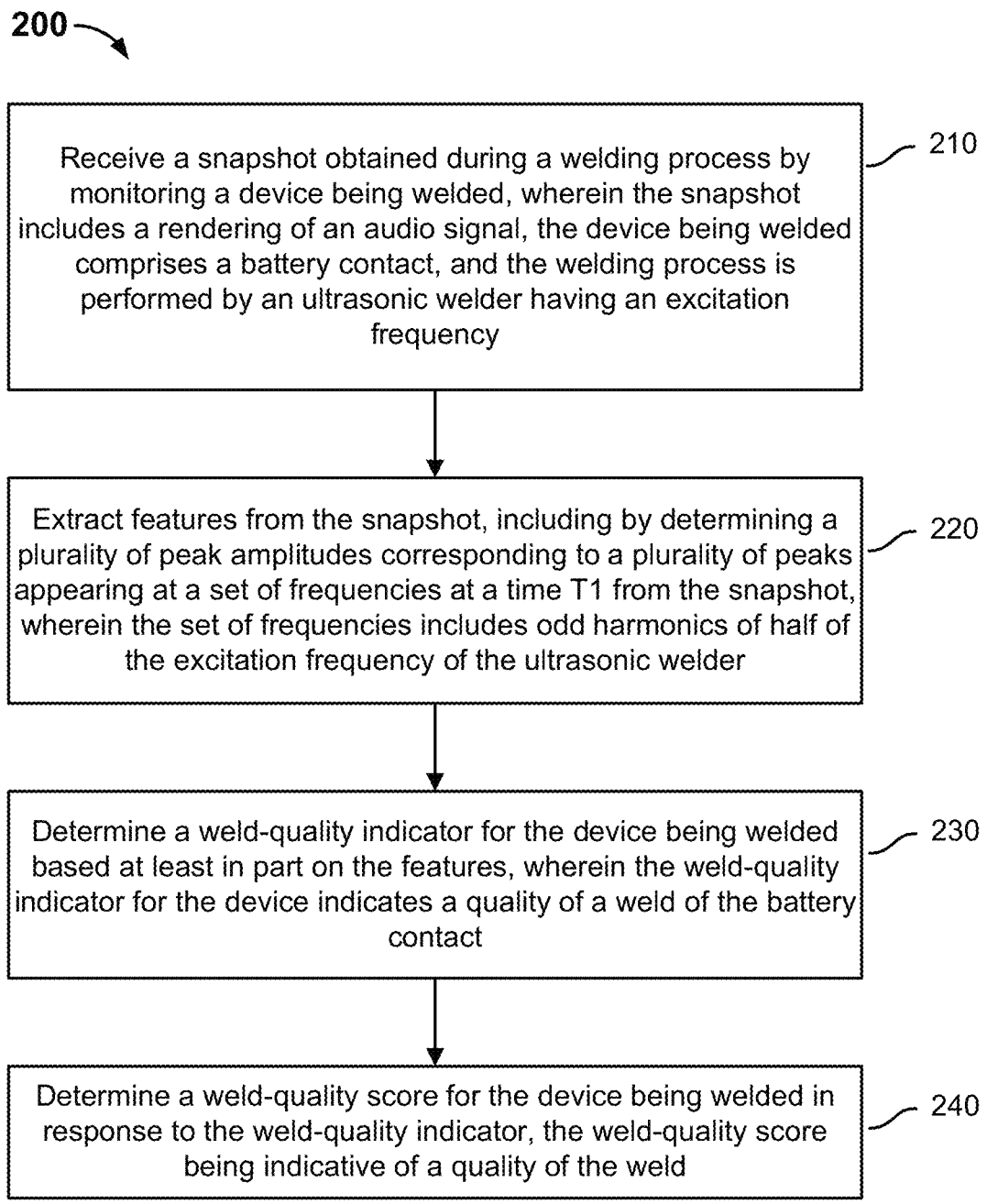
FIG. 2 is a flowchart illustrating an embodiment of a process to determine the quality of a weld for a battery contact using audio signals that includes determining peak amplitudes from the audio signals.

FIG. 2 is a flowchart illustrating an embodiment of a process 200 to determine the quality of a weld for a battery contact using audio signals that includes determining peak amplitudes from the audio signals.

At 210, a snapshot obtained during a welding process by monitoring a device being welded is received, wherein the snapshot includes a rendering of an audio signal, the device being welded comprises a battery contact, and the welding process is performed by an ultrasonic welder having an excitation frequency. In some examples, the device being welded comprises an aluminum tab connected to a battery cell and a copper bus bar and the welding process is performed by an ultrasonic welder to weld the aluminum tab to the copper bus bar.

At 220, features are extracted from the snapshot, including by determining a plurality of peak amplitudes corresponding to a plurality of peaks appearing at a set of frequencies at a time T1 from the snapshot, wherein the set of frequencies includes odd harmonics of half of the excitation frequency of the ultrasonic welder.

At 230, a weld-quality indicator for the device being welded is determined based at least in part on the features, wherein the weld-quality indicator for the device indicates a quality of a weld of the battery contact. In some examples, where the device being welded comprises an aluminum tab connected to a battery cell and a copper bus bar, the weld-quality indicator for the device indicates a quality of a weld between the aluminum tab and the copper bus bar.

At 240, a weld-quality score for the device being welded is determined in response to the weld-quality indicator, the weld-quality score being indicative of a quality of the weld.

Figure 3:
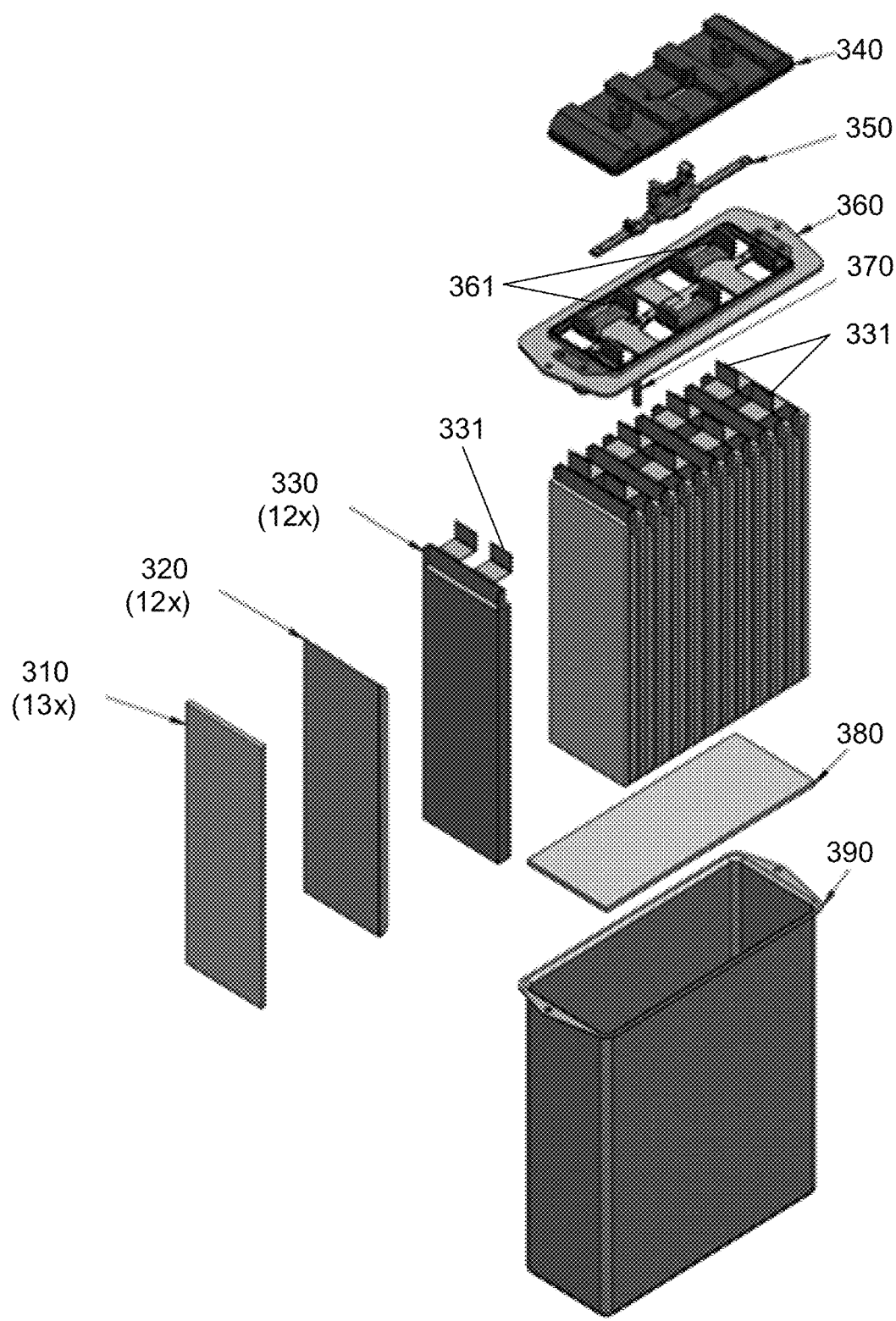
FIG. 3 is a diagram illustrating components of an exemplary battery, including components that are welding during a battery build process.

FIG. 3 is a diagram illustrating components of an exemplary battery, including components that are welding during a battery build process. In this example, the battery includes 13 units of insulation (310), 12 thermal conductors with fins (320), 12 cells (330), a tab cover (340), a printed circuit board (PCB) (350), a top plate (360), a thermistor (370), bottom insulation (380), and a can (390). Also shown in FIG. 3 are aluminum tabs (331) that are connected to each of the cells (330) and copper bus bars (361) that are positioned or mounted to the top plate (360).

Figure 4:
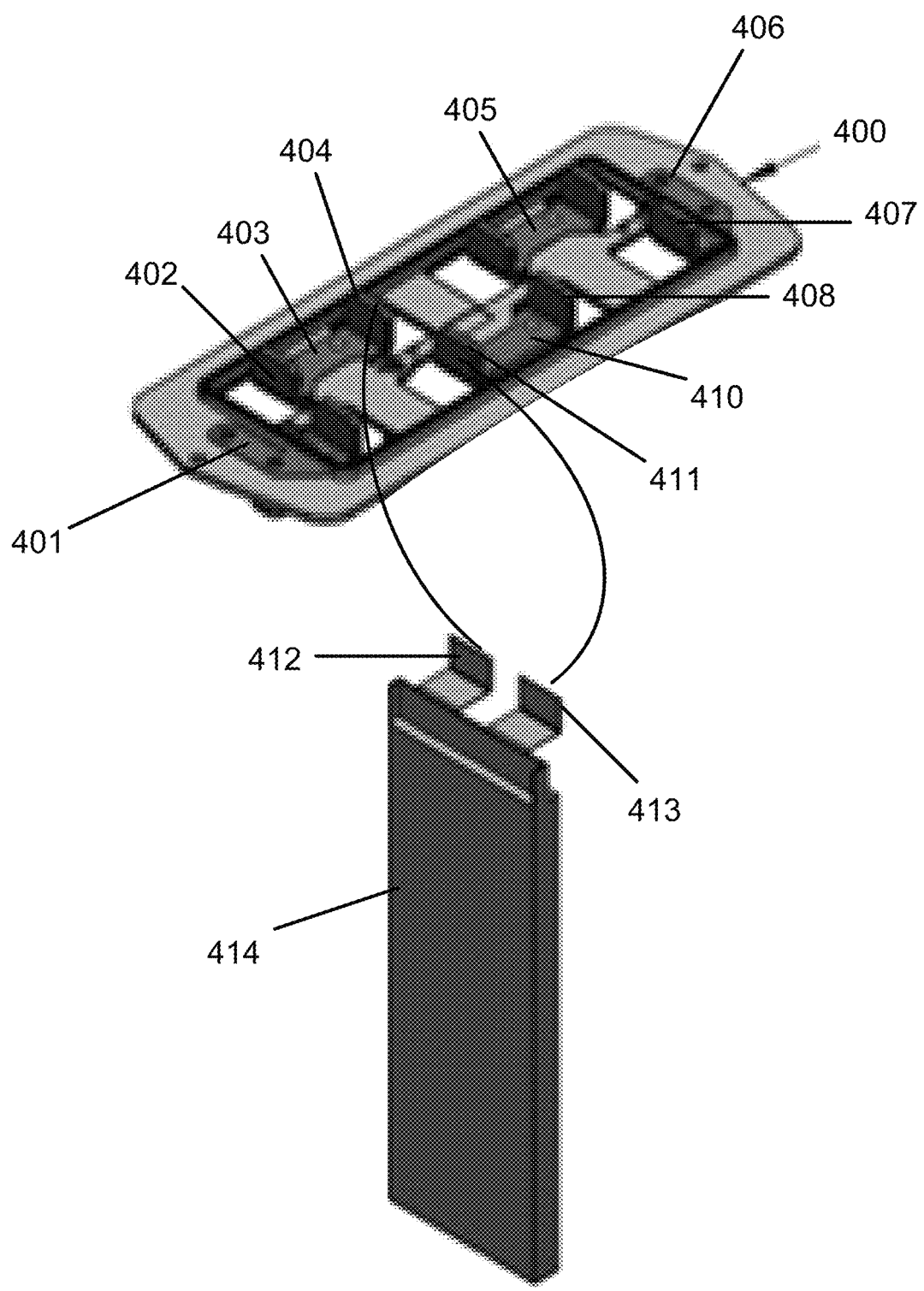
FIG. 4 is a diagram illustrating an embodiment of a top plate having copper bus bars and a battery cell with aluminum tabs.

FIG. 4 is a diagram illustrating an embodiment of a top plate having copper bus bars and a battery cell with aluminum tabs. This example continues the previous example where top plate 360 and one of the cells 330 from FIG. 3 are shown and described in greater detail. In FIG. 4, top plate 400 includes copper bus bars 403, 405 and 410, which are U-shaped, and copper bus bars 401 and 406, which are L-shaped. For example, copper bus bars 403 is shown with two arms 402 and 404 extending upward on either side of a central middle portion mounted to top plate 400, the arms and middle portion of copper bus bar 403 taken together forming a U-shape. Additionally, copper bus bar 406 is shown with an arm 407 extending upward from a bottom portion of copper bus bar 406 mounted to top plate 400, the arm and the bottom portion of copper bus bar 406 forming an L-shape. Also depicted in FIG. 4 are a cell 414 having aluminum tabs 412 and 413. In the example shown, aluminum tab 412 can be welded to copper bus bar 403 at an arm 404 and aluminum tab 413 can be welded to copper bus bar 410 at an arm 411.

Figure 5:
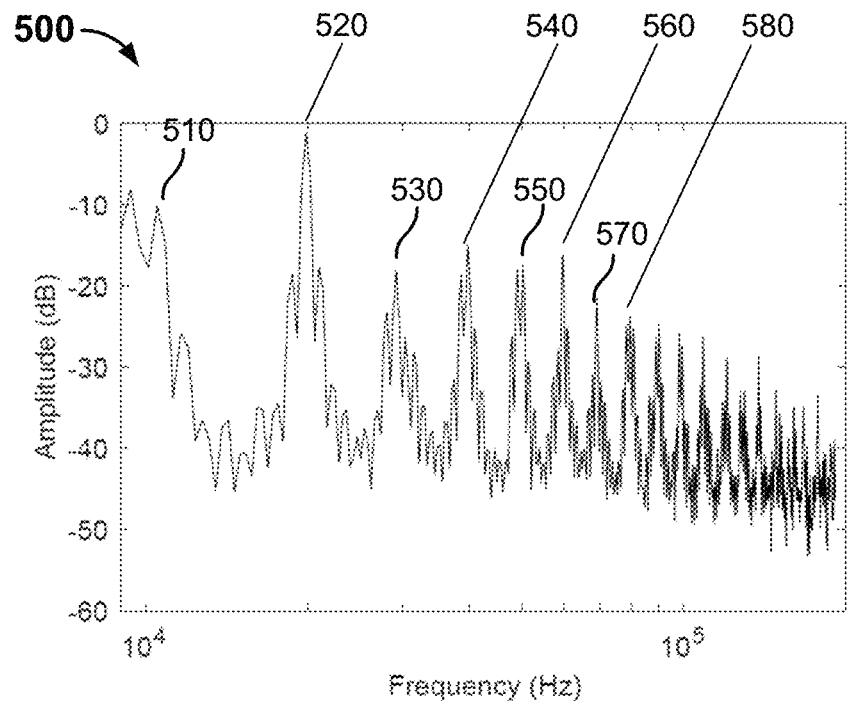
FIG. 5 depicts an embodiment of a snapshot of a good weld obtained during a welding process by monitoring a device being welded.

FIG. 5 depicts an embodiment of a snapshot 500 of a good weld obtained during a welding process by monitoring a device being welded. In this case, the device being welded comprises an aluminum tab (e.g., aluminum tab 412 of FIG. 4) connected to a battery cell (e.g., cell 414 of FIG. 4) and a copper bus bar (e.g., copper bus bar 403). Here, the welding process is performed by an ultrasonic welder having an excitation frequency of 20 kHz to weld the aluminum tab to the copper bus bar.

In the example shown, snapshot 500 includes a rendering of an audio signal, which in some embodiments is captured and recorded using an ultrasonic microphone. In this particular rendering, an amplitude of the audio signal in dB is plotted as a function of frequency in Hz. Here, snapshot 500 depicts a good weld characterized by a plurality of peak amplitudes corresponding to a plurality of peaks appearing at a set of frequencies at a time T1. In particular, peaks in this example appear at a set of frequencies that includes harmonics of the excitation frequency of 20 kHz at 520, including more specifically, frequencies of 40 kHz at 540, 60 kHz at 560 and 80 kHz at 580 at a time T1=100 ms. Here, the time T1 is the amount of time that has passed since initiating the welding process and represents the time that the snapshot was taken into the duration of the welding process. Additionally, for a good weld as depicted in snapshot 500, peaks also appear at a set of frequencies that includes odd harmonics of half of the excitation frequency, which in this case is a frequency of 10 kHz at 510. This additional set of peaks includes frequencies of 30 kHz at 530, 50 kHz at 550 and 70 kHz at 570 at a time T1=100 ms.

Figure 6:
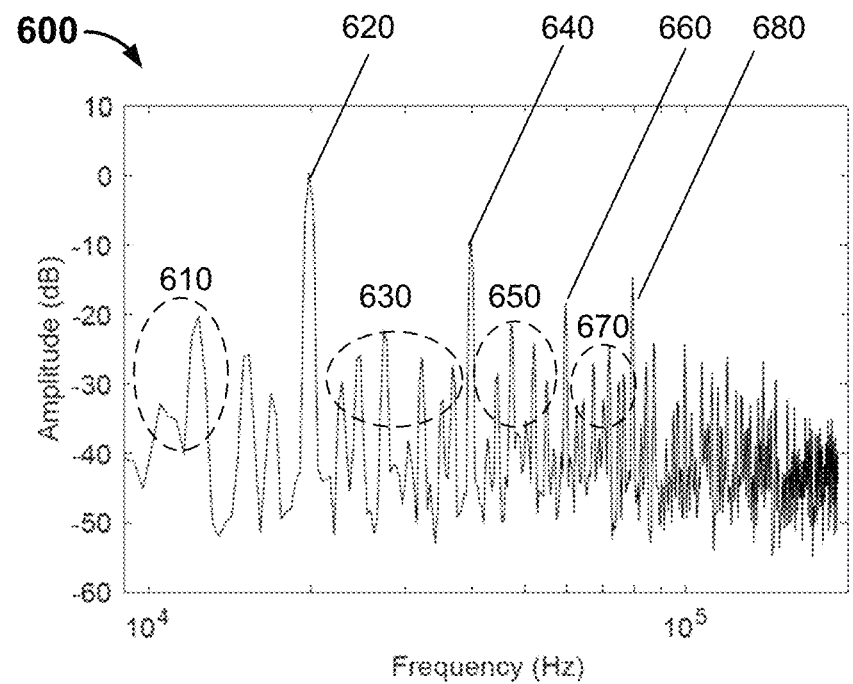
FIG. 6 depicts an embodiment of a snapshot of a bad weld obtained during a welding process by monitoring a device being welded.

FIG. 6 depicts an embodiment of a snapshot 600 of a bad weld obtained during a welding process by monitoring a device being welded. In this case, the device being welded comprises an aluminum tab (e.g., aluminum tab 412 of FIG. 4) connected to a battery cell (e.g., cell 414 of FIG. 4) and a copper bus bar (e.g., copper bus bar 403). Here, the welding process is performed by an ultrasonic welder having an excitation frequency of 20 kHz to weld the aluminum tab to the copper bus bar.

In the example shown, snapshot 600 includes a rendering of an audio signal, which in some embodiments is captured and recorded using an ultrasonic microphone. In this particular rendering, an amplitude of the audio signal in dB is plotted as a function of frequency in Hz. Here, snapshot 600 depicts a bad weld characterized by a plurality of peak amplitudes corresponding to a plurality of peaks appearing at a set of frequencies at a time T1. Similar to the example of a good weld depicted in FIG. 5, peaks in this example appear at a set of frequencies that includes harmonics of the excitation frequency of 20 kHz at 620, including more specifically, frequencies of 40 kHz at 640, 60 kHz at 660 and 80 kHz at 680 at a time T1=100 ms. As in the previous example of FIG. 5, the time T1 in this case is the amount of time that has passed since initiating the welding process and represents the time that the snapshot was taken into the duration of the welding process.

But note that for a bad weld as depicted in snapshot 600, distinct peaks do not appear at a set of frequencies that includes odd harmonics of half of the excitation frequency, which in this case is a frequency of 10 kHz. Instead, unlike the previous example of a good weld shown in FIG. 5, the signal in regions around odd harmonics of 10 kHz (i.e., the set of frequencies that include 30 kHz, 50 kHz, and 70 kHz) are much noisier, as shown at 610, 630, 650 and 670 respectively. For example, instead of one distinct peak around 30 kHz as shown at 530 in FIG. 5, there are many peaks around 30 kHz at 610 in FIG. 6.

As shown in FIGS. 5 and 6, snapshots that include a rendering of an audio signal taken at a time T1=100 ms exhibit differences between good welds and bad welds that can be used to distinguish between a good weld and a bad weld and to determine a metric for weld-quality. These differences are used for example in the embodiment of process 200 of FIG. 2 to determine the quality of a weld for a battery contact by determining peak amplitudes from audio signals such as those captured in snapshots 500 and 600. In some embodiments, a weld-quality indicator for the device being welded is determined in response to the detection and identification of peak amplitudes. For example, the identification and detection of a distinct peak at a set of frequencies that includes odd harmonics of half of the excitation frequency (e.g., frequencies of 30 kHz, 50 kHz and 70 kHz at a time T1=100 ms) is indicative of a good weld and conversely, the absence of distinct peaks at this set of frequencies indicates a bad weld. Accordingly, a weld-quality indicator based on identifying and detecting a distinct set of peaks at frequencies that includes odd harmonics of half of the excitation frequency is determined in response to a plurality of peak amplitudes corresponding to the distinct set of peaks at these frequencies.

In some embodiments, peak detection is performed using a baseline and/or midpoint. The following figures show an example of this.

Figure 7:
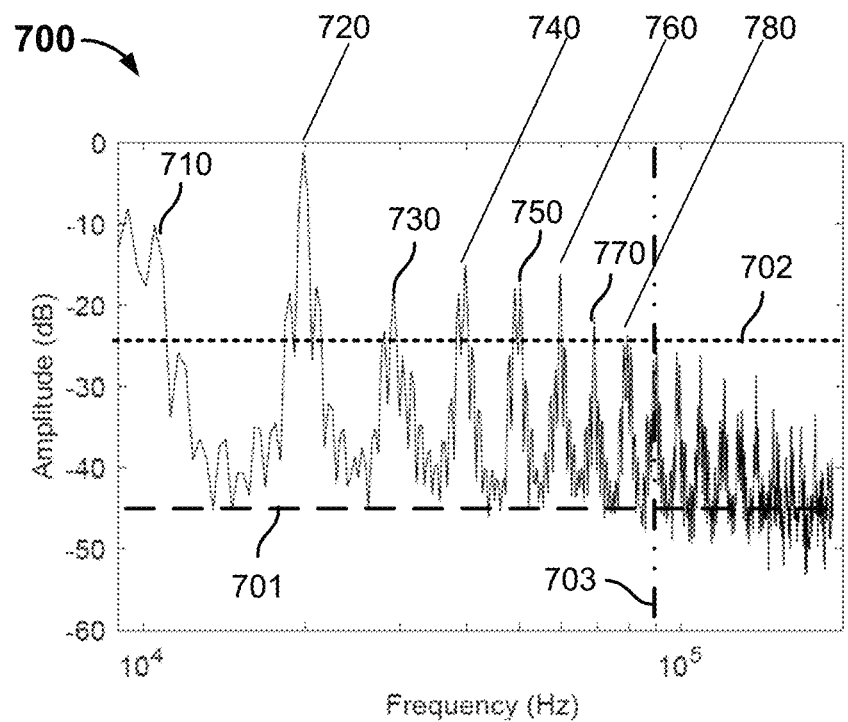
FIG. 7 depicts an embodiment of a snapshot of the good weld of FIG. 5 illustrating the identification and detection of a plurality of peak amplitudes by a peak detector.

FIG. 7 depicts an embodiment of a snapshot 700 of the good weld of FIG. 5 illustrating the identification and detection of a plurality of peak amplitudes by a peak detector. While various methods of peak detection can be employed without limiting the technique described herein, as one example, a process of peak detection includes determining a baseline of the audio signal as depicted in a snapshot by finding a set of local minima and fitting a line representing the baseline (depicted at 701) to the local minima of snapshot 700. An amplitude of the excitation frequency (e.g., a peak amplitude at 20 kHz) is determined at 720 to obtain a relative amplitude maximum to compare against the rest of the signal. The peak amplitude of the excitation frequency of 20 kHz is used to find a midpoint between the peak amplitude at 20 kHz and the baseline 701. In FIG. 7, the midpoint is represented by a line (shown at 702) between the peak amplitude and the baseline 701 across the whole frequency plot of snapshot 700.

Peaks are detected and identified as points on the frequency plot of snapshot 700 where the amplitude of the signal goes above the midpoint 702, through various points of time. In this case, snapshot 700 is taken at a time T1=100 ms and peaks are detected and identified as points 710, 720, 730, 740, 750, 760, 770, and 780 respectively, which are the points on the frequency plot of snapshot 700 where the amplitude of the signal goes above the midpoint 702. Note that the identified peaks in this example appear at a set of frequencies that includes the excitation frequency of 20 kHz at 720 and its harmonics, including more specifically, frequencies of 40 kHz at 740, 60 kHz at 760 and 80 kHz at 780 and also at set of frequencies that includes odd harmonics of half of the excitation frequency (10 kHz) including frequencies of 30 kHz at 730, 50 kHz at 750 and 70 kHz at 770.

Figure 8:
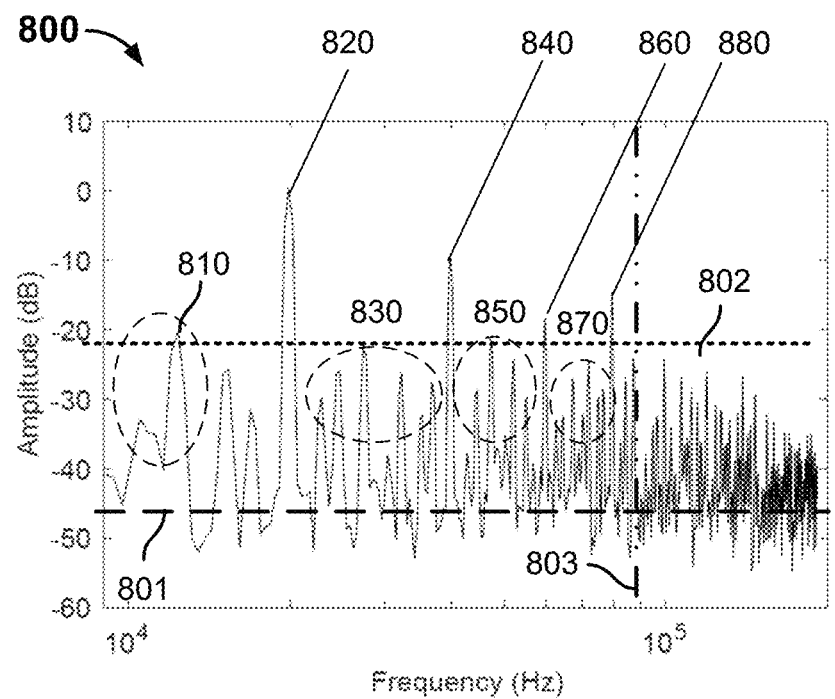
FIG. 8 depicts an embodiment of a snapshot of the bad weld of FIG. 6 illustrating the identification and detection of a plurality of peak amplitudes by a peak detector.

FIG. 8 depicts an embodiment of a snapshot 800 of the bad weld of FIG. 6 illustrating the identification and detection of a plurality of peak amplitudes by a peak detector. As in the previous example, a process of peak detection includes determining a baseline of the audio signal as depicted in a snapshot by finding a set of local minima and fitting a line representing the baseline (depicted at 801) to the local minima of snapshot 800. An amplitude of the excitation frequency (e.g., a peak amplitude at 20 kHz) is determined at 820 to obtain a relative amplitude maximum to compare against the rest of the signal. The peak amplitude of the excitation frequency of 20 kHz is used to find a midpoint between the peak amplitude at 20 kHz and the baseline 801. In FIG. 8, the midpoint is represented by a line (shown at 802) between the peak amplitude and the baseline 801 across the whole frequency plot of snapshot 800.

As in the previous example, peaks are detected and identified as points on the frequency plot of snapshot 800 where the amplitude of the signal goes above the midpoint 802, through various points of time. In this case, snapshot 800 is taken at a time T1=100 ms and peaks are detected and identified as points 810, 820, 840, 860, and 880 respectively, which are the points on the frequency plot of snapshot 800 where the amplitude of the signal goes above the midpoint 802. Note that, like the previous example of FIG. 7, the identified peaks in this example appear at a set of frequencies that includes the excitation frequency of 20 kHz at 820 and its harmonics, including more specifically, frequencies of 40 kHz at 840, 60 kHz at 860 and 80 kHz at 880. But unlike the previous example of FIG. 7, no clear distinct peaks are identified and detected at frequencies that include odd harmonics of half of the excitation frequency (10 kHz) and instead, we see a noisy signal in regions around these frequencies namely at regions shown at 830, 850 and 870. Moreover, although a peak appears at 810 it is at a frequency of around 12 kHz, which is not at half of the excitation frequency.

In some embodiments, an amplitude of the excitation frequency (e.g., a peak amplitude at 20 kHz) is determined by a normalizing process, for example, by averaging different peak amplitudes at the excitation frequency based on different setups of an ultrasonic microphone, moving the microphone closer to or further away from the audio source (e.g., the ultrasonic welder and/or the device being welded) to account for differences in setup that will impact the absolute amplitude measured at the excitation frequency.

Additionally, in some examples and as shown in FIG. 7 at 703 and in FIG. 8 at 803 respectively, the audio signal in a higher frequency range is ignored as noise by determining a cutoff frequency f, above which the signal is not analyzed or considered for purposes of peak detection or determining a weld-quality indicator. One way of determining a cutoff frequency f, is to examine or analyze a number of examples or snapshots of good welds and bad welds to determine whether a correlation exists between the high frequency components of the signals. The cutoff frequency is determined by finding a frequency above which no correlation is detected between the good welds and the bad welds. Note that the cutoff frequency may be a function of the limitations of the microphone being used to capture the audio signals. For example, at a certain frequency the resolution of the microphone may be degraded such that the microphone can no longer resolve the signal at a higher frequency range. In these cases, the cutoff frequency is set based on the ability of the microphone to resolve the signal (e.g., taking the lower 60% of the frequency range) and a range of frequencies is chosen to discard data that the microphone is not able to sufficiently resolve.

Various methods can be used to determine a weld-quality indicator based at least in part on the extracted features. Such features include for example, a plurality of peak amplitudes corresponding to a plurality of peaks appearing at a set of frequencies at a time T1 from the snapshot. In particular, the presence or absence of peaks at specific frequencies (e.g., the odd harmonics of half of the excitation frequency of 30 kHz, 50 kHz and 70 kHz respectively) can each be used as a weld-quality indicator and a weld-quality score can be determined by a combination of the weld-quality indicators using a voting scheme or weighted combination of the indicators. Alternatively, the presence or absence of peaks at a set of specific frequencies (e.g., the odd harmonics of half of the excitation frequency of 30 kHz, 50 kHz and 70 kHz respectively) can be combined to determine a weld-quality indicator for this particular characteristic (i.e., presence of peaks at odd harmonics of half of the excitation frequency). In some embodiments, the resulting weld-quality indicator is used in combination with other weld-quality indicators for other characteristics as described herein to determine a weld-quality score, the weld-quality score being indicative of a quality of the weld.

In some embodiments peak detection is performed by determining a difference in amplitude between an excitation peak amplitude and each of a plurality of peaks (e.g., appearing at a set of frequencies at a particular time in a snapshot). The following figures describe some such examples in the context of an exemplary system where an aluminum tab from a battery cell is welded to a copper bus bar. Naturally, this process may be performed on systems with other things being welded together.

Figure 9:
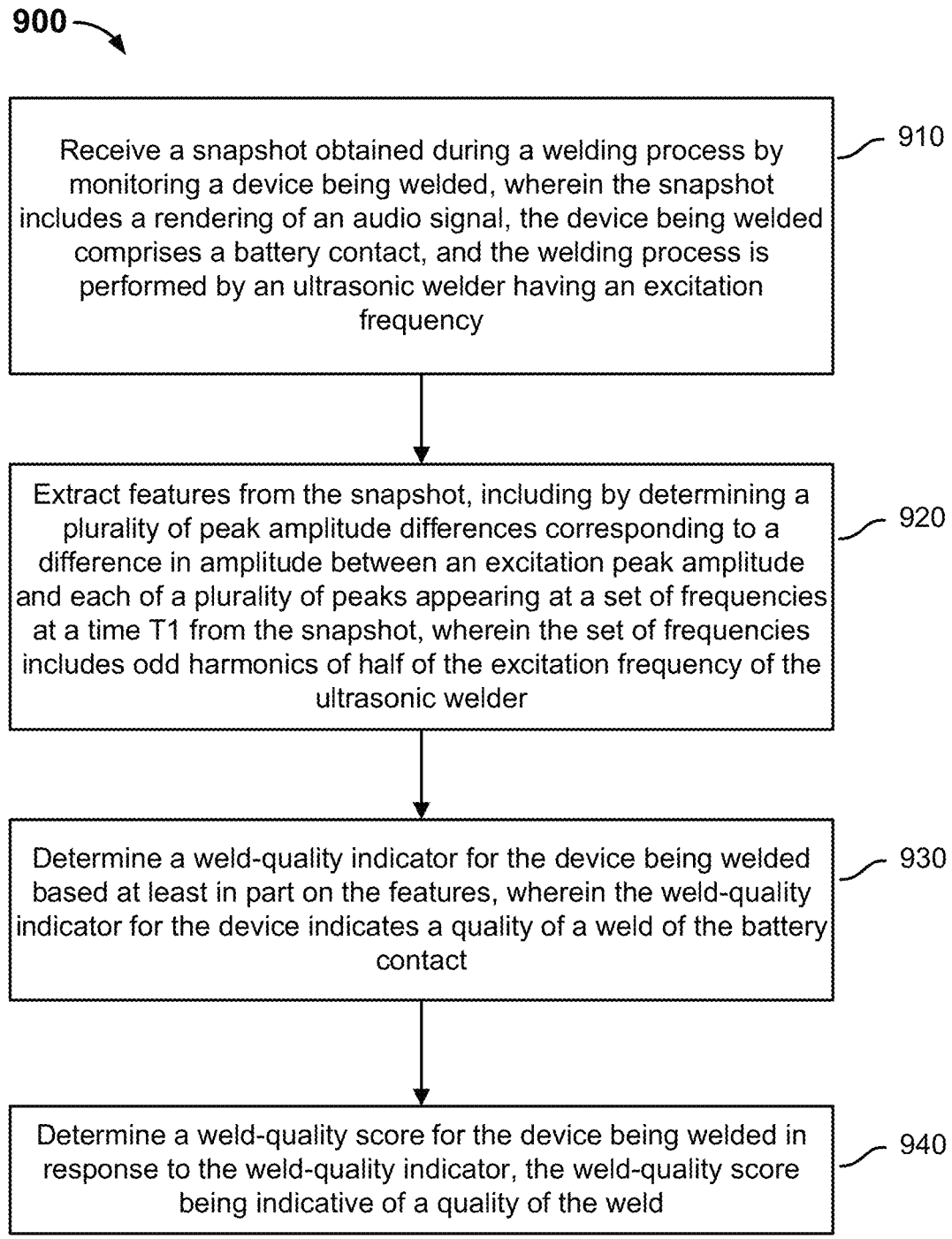
FIG. 9 is a flowchart illustrating an embodiment of a process to determine the quality of a weld for a battery contact using audio signals that includes determining peak amplitude differences from the audio signals.

FIG. 9 is a flowchart illustrating an embodiment of a process 900 to determine the quality of a weld for a battery contact using audio signals that includes determining peak amplitude differences from the audio signals.

At 910, a snapshot obtained during a welding process by monitoring a device being welded is received, wherein the snapshot includes a rendering of an audio signal, the device being welded comprises a battery contact, and the welding process is performed by an ultrasonic welder having an excitation frequency. In some examples, the device being welded comprises an aluminum tab connected to a battery cell and a copper bus bar and the welding process is performed by an ultrasonic welder having an excitation frequency to weld the aluminum tab to the copper bus bar.

At 920, features are extracted from the snapshot, including by determining a plurality of peak amplitude differences corresponding to a difference in amplitude between an excitation peak amplitude and each of a plurality of peaks appearing at a set of frequencies at a time T1 from the snapshot, wherein the set of frequencies includes odd harmonics of half of the excitation frequency of the ultrasonic welder.

At 930, a weld-quality indicator for the device being welded is determined based at least in part on the features. The weld-quality indicator for the device indicates a quality of a weld of the battery contact. In some examples, where the device being welded comprises an aluminum tab connected to a battery cell and a copper bus bar, the weld-quality indicator for the device indicates a quality of a weld between the aluminum tab and the copper bus bar.

At 940, a weld-quality score for the device being welded is determined in response to the weld-quality indicator, the weld-quality score being indicative of a quality of the weld.

Figure 10:
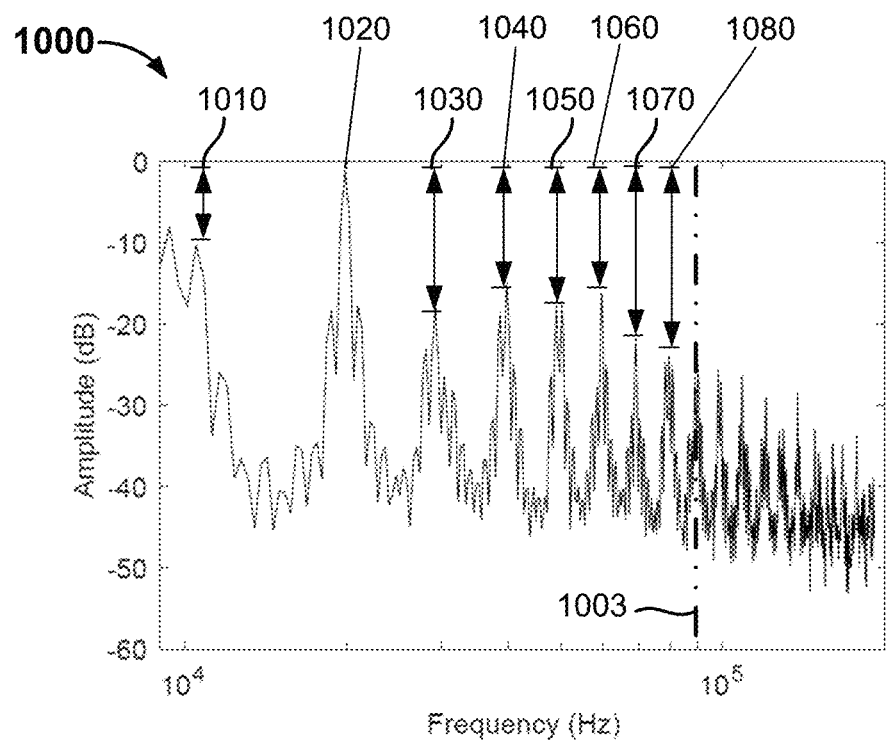
FIG. 10 depicts an embodiment of a snapshot of the good weld of FIG. 5 illustrating a process that includes determining peak amplitude differences from the audio signals.

FIG. 10 depicts an embodiment of a snapshot 1000 of the good weld of FIG. 5 illustrating the process 900 that includes determining peak amplitude differences from the audio signals. Peaks are detected and identified as points on the frequency plot of snapshot 1000 at a time T1=100 ms. A plurality of peak amplitude differences is determined at 1010, 1030, 1040, 1050, 1060, 1070, and 1080 respectively. Each of the peak amplitude differences corresponds to a difference in amplitude between an excitation peak amplitude, shown at 1020, and each of a plurality of peaks appearing at a set of frequencies at a time T1 (e.g., 100 ms) from the snapshot as described in previous examples shown in FIGS. 5 and 7. As noted above, various methods of peak detection can be employed without limiting the technique described herein including the method described with respect to FIGS. 7 and 8. Additionally, in some embodiments an amplitude of the excitation frequency (e.g., the peak amplitude at 20 kHz) is determined by a normalizing process as described above.

Figure 11:
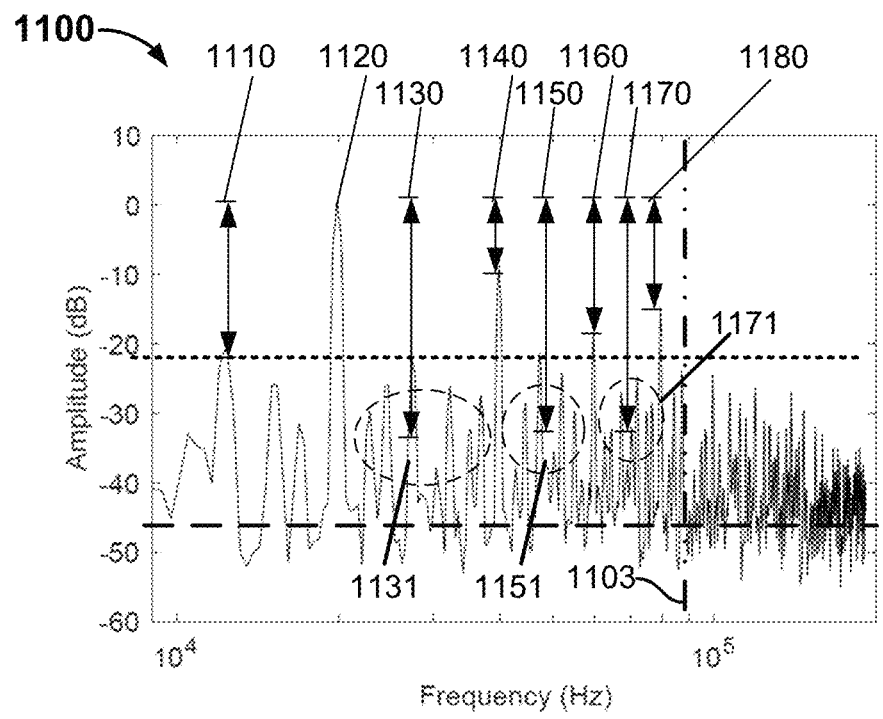
FIG. 11 depicts an embodiment of a snapshot of the bad weld of FIG. 6 illustrating a process that includes determining peak amplitude differences from the audio signals.

FIG. 11 depicts an embodiment of a snapshot 1100 of the bad weld of FIG. 6 illustrating the process 900 that includes determining peak amplitude differences from the audio signals. Peaks are detected and identified as points on the frequency plot of snapshot 1100 at a time T1=100 ms. A plurality of peak amplitude differences is determined at 1110, 1140, 1160, and 1180 respectively at the points where peaks have been detected. Note that in this case, unlike the example of FIG. 10 showing a good weld, no peaks are detected in regions indicated at 1131, 1151, and 1171 respectively (i.e., frequency ranges where peaks appeared in the good weld at odd harmonics of half of the excitation frequency).

As in the previous example, each of the peak amplitude differences corresponds to a difference in amplitude between an excitation peak amplitude, shown at 1120, and each of a plurality of peaks appearing at a set of frequencies (e.g., harmonics of the excitation frequency, which in this case are at 40 kHz, 60 kHz, and 80 kHz) at a time T1 (e.g., 100 ms) from the snapshot as described in previous examples shown in FIGS. 6 and 8. As noted above, various methods of peak detection can be employed without limiting the technique described herein including the method described with respect to FIGS. 7 and 8. Additionally, in some embodiments an amplitude of the excitation frequency (e.g., the peak amplitude at 20 kHz) is determined by a normalizing process as described above.

In some embodiments, although no peaks are detected in regions indicated at 1131, 1151, and 1171 respectively, peak amplitude differences for the odd harmonics of half the excitation frequency are tracked by taking a difference in amplitude between an excitation peak amplitude, shown at 1120, and an average peak value or local maximum at the frequencies given by the odd harmonics of half the excitation frequency. Peak amplitude differences are shown at 1130 for the signal at 30 kHz, 1150 for the signal at 50 kHz, and 1170 for the signal at 70 kHz.

Various methods can be used to determine a weld-quality indicator based at least in part on the extracted features. For example, such features include a plurality of peak amplitude differences corresponding to a difference in amplitude between an excitation peak amplitude and each of a plurality of peaks appearing at a set of frequencies at a time T1 from the snapshot. In particular, magnitudes of a peak amplitude difference determined for each peak at specific frequencies (e.g., the odd harmonics of half of the excitation frequency of 30 kHz, 50 kHz and 70 kHz respectively) can each be used as a weld-quality indicator and a weld-quality score can be determined by a combination of the weld-quality indicators using a voting scheme or weighted combination of the indicators. Alternatively, the magnitudes of peak amplitude differences determined for a set of peaks at specific frequencies (e.g., the odd harmonics of half of the excitation frequency of 30 kHz, 50 kHz and 70 kHz respectively) can be combined to determine a weld-quality indicator for this particular characteristic (i.e., magnitude of peak differences at odd harmonics of half of the excitation frequency). The resulting weld-quality indicator is used in combination with other weld-quality indicators (e.g., presence of peaks at odd harmonics of half of the excitation frequency) for other characteristics as described herein to determine a weld-quality score, the weld-quality score being indicative of a quality of the weld.

Figure 12:
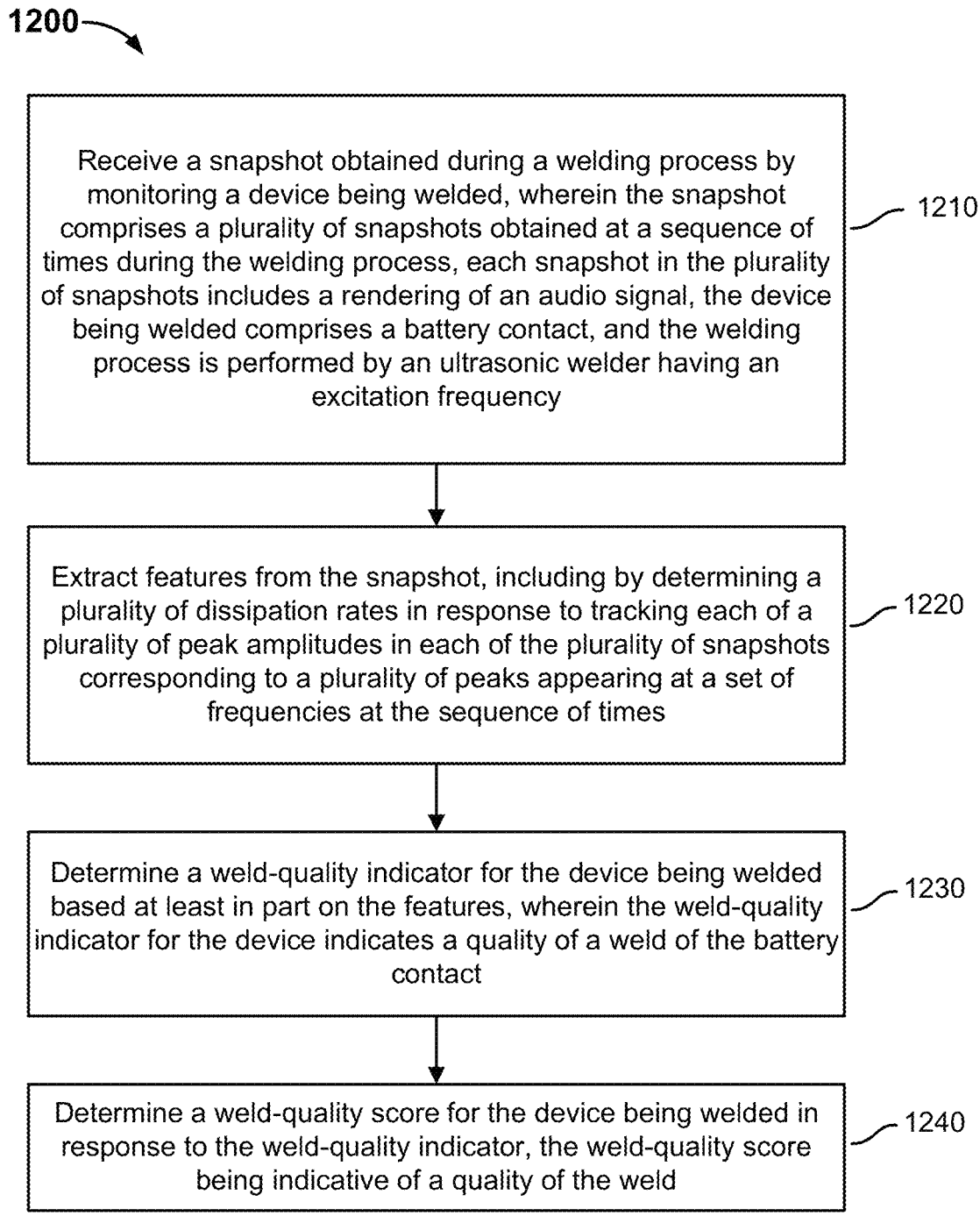
FIG. 12 is a flowchart illustrating an embodiment of a process to determine the quality of a weld for a battery contact using audio signals that includes determining dissipation rates in response to tracking peak amplitudes in a series of snapshots that include renditions of audio signals.

FIG. 12 is a flowchart illustrating an embodiment of a process 1200 to determine the quality of a weld for a battery contact using audio signals that includes determining dissipation rates in response to tracking peak amplitudes in a series of snapshots that include renditions of audio signals.

At 1210, a snapshot obtained during a welding process by monitoring a device being welded is received, wherein the snapshot comprises a plurality of snapshots obtained at a sequence of times during the welding process, each snapshot in the plurality of snapshots includes a rendering of an audio signal, the device being welded comprises a battery contact, and the welding process is performed by an ultrasonic welder having an excitation frequency. Examples of a plurality of snapshots obtained at a sequence of times during the welding process are depicted in FIGS. 13A-13C and 14A-14C. In some examples, the device being welded comprises an aluminum tab connected to a battery cell and a copper bus bar and the welding process is performed by an ultrasonic welder having an excitation frequency to weld the aluminum tab to the copper bus bar.

At 1220, features are extracted from the snapshot, including by determining a plurality of dissipation rates in response to tracking each of a plurality of peak amplitudes in each of the plurality of snapshots corresponding to a plurality of peaks appearing at a set of frequencies at the sequence of times. In some embodiments, the set of frequencies includes odd harmonics of half of the excitation frequency of the ultrasonic welder.

At 1230, a weld-quality indicator for the device being welded is determined based at least in part on the features, wherein the weld-quality indicator for the device indicates a quality of a weld of the battery contact. The weld-quality indicator for the device indicates a quality of a weld of the battery contact. In some examples, where the device being welded comprises an aluminum tab connected to a battery cell and a copper bus bar, the weld-quality indicator for the device indicates a quality of a weld between the aluminum tab and the copper bus bar.

At 1240, a weld-quality score for the device being welded is determined in response to the weld-quality indicator, the weld-quality score being indicative of a quality of the weld.

Figure 13A:
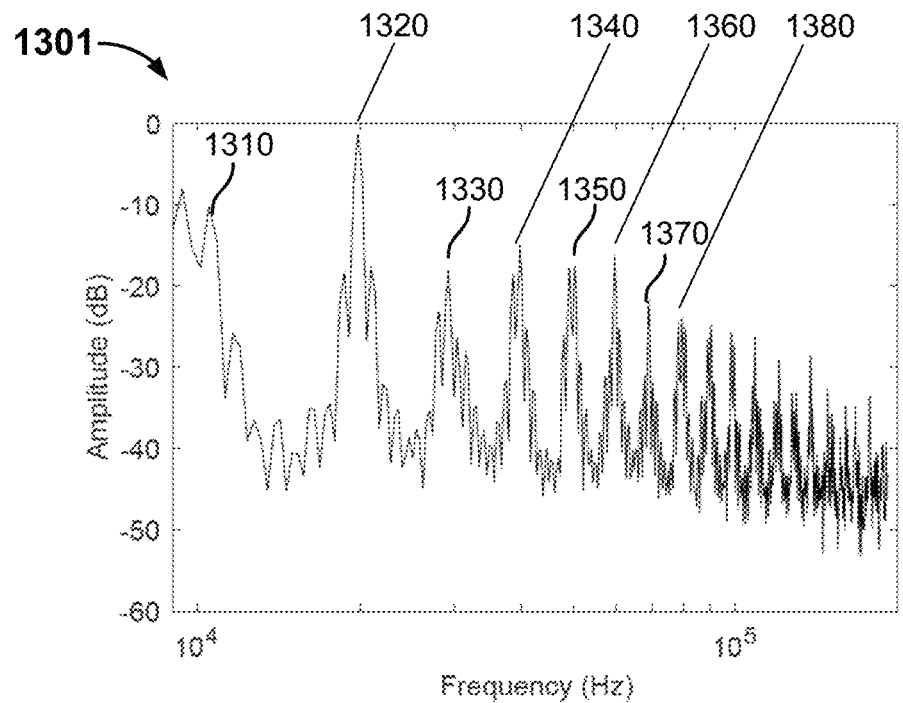
FIG. 13A depicts an embodiment of a first snapshot in a plurality of snapshots obtained at a sequence of times during the welding process for a good weld.
Figure 13B:
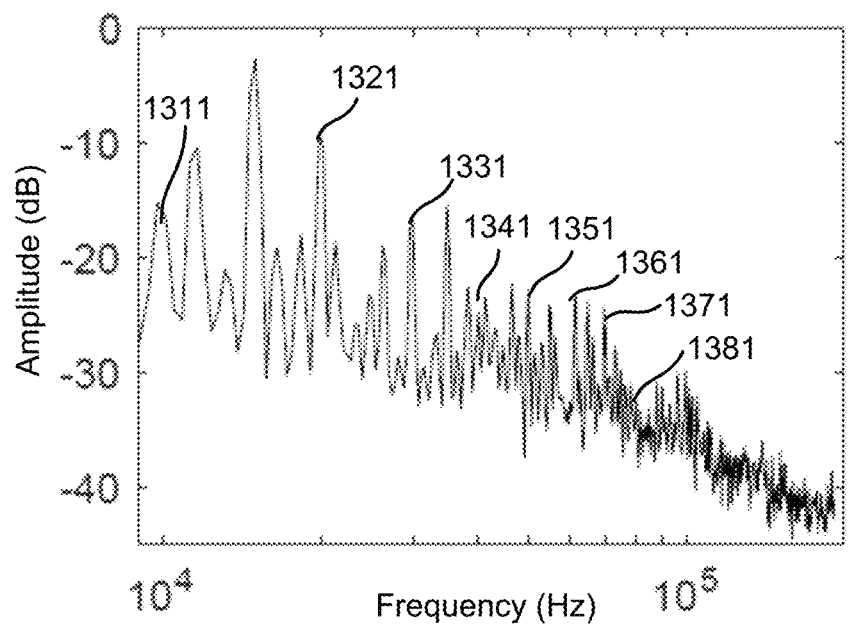
FIG. 13B depicts an embodiment of a second snapshot in a plurality of snapshots obtained at a sequence of times during the welding process for a good weld.
Figure 13C:
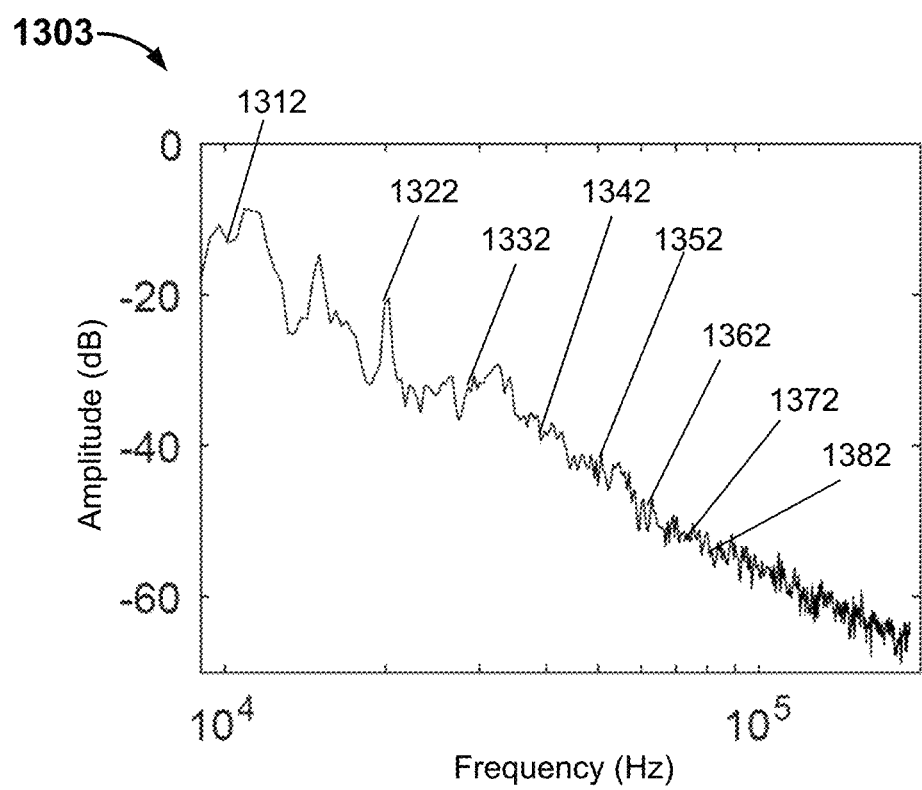
FIG. 13C depicts an embodiment of a third snapshot in a plurality of snapshots obtained at a sequence of times during the welding process for a good weld.

FIGS. 13A-13C depict an embodiment of a plurality of snapshots obtained at a sequence of times during the welding process for a good weld, wherein each snapshot in the plurality of snapshots includes a rendering of an audio signal as discussed with respect to step 1210 of FIG. 12.

FIG. 13A depicts an embodiment of a first snapshot 1301 in a plurality of snapshots obtained at a sequence of times during the welding process for a good weld, the first snapshot 1301 corresponding to a time T1=100 ms after initiating the welding process. As shown in FIG. 13A, once a plurality of peak amplitudes corresponding to a plurality of peaks appearing at a set of frequencies at a time T1 have been determined from snapshot 1301 according to methods described herein, each of the peak amplitudes (as determined for example, by taking a local maximum of each peak at a certain time) is tracked as the weld progresses. In the example shown, the set of frequencies includes odd harmonics of half of the excitation frequency of the ultrasonic welder. Accordingly, peak amplitudes are obtained from snapshot 1301 corresponding to local maxima at frequencies of 10 kHz at 1310, 20 kHz at 1320, 30 kHz at 1330, 40 kHz at 1340, 50 kHz at 1350, 60 kHz at 1360, 70 kHz at 1370, and 80 kHz at 1380 respectively.

FIG. 13B depicts an embodiment of a second snapshot 1302 in a plurality of snapshots obtained at a sequence of times during the welding process for a good weld, the second snapshot 1302 corresponding to a time T2=400 ms after initiating the welding process. Continuing the previous example shown in FIG. 13A, once a plurality of peak amplitudes corresponding to a plurality of peaks appearing at a set of frequencies at a time T1 have been determined from snapshot 1301 according to methods described herein, each of the peak amplitudes at those frequencies (as determined for example, by taking a local maximum of each peak at a certain time) is tracked as the weld progresses. In the example shown, the set of frequencies includes odd harmonics of half of the excitation frequency of the ultrasonic welder. Accordingly, peak amplitudes obtained from snapshot 1301 corresponding to local maxima at frequencies of 10 kHz, 20 kHz, 30 kHz, 40 kHz, 50 kHz, 60 kHz, 70 kHz, and 80 kHz respectively are tracked in the second snapshot 1302 of FIG. 13B.

In particular, as shown in FIG. 13B, peak amplitudes are obtained from snapshot 1302 corresponding to local maxima at frequencies of 10 kHz at 1311, 20 kHz at 1321, 30 kHz at 1331, 40 kHz at 1341, 50 kHz at 1351, 60 kHz at 1361, 70 kHz at 1371, and 80 kHz at 1381 respectively.

In some embodiments, once the peak amplitudes are obtained from snapshot 1302 at time T2 and snapshot 1301 at time T1, a dissipation rate is determined that captures a rate that a peak amplitude at a given frequency is changing over a given time interval (e.g., the time interval between two snapshots) based on taking a difference between the local maximum of the peak at the given frequency at time T1 and the local maximum of the peak at the given frequency at time T2 and dividing by the time difference T2−T1. For example, a dissipation rate for a peak at 30 kHz is determined by taking a difference between the peak amplitude at 1330 in snapshot 1301 of FIG. 13A and the peak amplitude at 1331 in snapshot 1302 of FIG. 13B divided by the time difference between the two snapshots, T2−T1=400 ms−100 ms=300 ms. This process can be repeated to track a rate of dissipation (or rate of change) for each identified and detected peak over a given time interval (e.g., the time between two snapshots), which in this case are the peaks shown at frequencies of 10 kHz, 20 kHz, 30 kHz, 40 kHz, 50 kHz, 60 kHz, 70 kHz, and 80 kHz respectively.

FIG. 13C depicts an embodiment of a third snapshot 1303 in a plurality of snapshots obtained at a sequence of times during the welding process for a good weld, the third snapshot 1303 corresponding to a time T3—680 ms after initiating the welding process. Continuing the previous example shown in FIG. 13A, once a plurality of peak amplitudes corresponding to a plurality of peaks appearing at a set of frequencies at a time T1 have been determined from snapshot 1301 according to methods described herein, each of the peak amplitudes at those frequencies (as determined for example, by taking a local maximum of each peak at a certain time) is tracked as the weld progresses. In the example shown, the set of frequencies includes odd harmonics of half of the excitation frequency of the ultrasonic welder. Accordingly, peak amplitudes obtained from snapshot 1303 corresponding to local maxima at frequencies of 10 kHz, 20 kHz, 30 kHz, 40 kHz, 50 kHz, 60 kHz, 70 kHz, and 80 kHz respectively are tracked in the second snapshot 1303 of FIG. 13C.

In particular, as shown in FIG. 13C, peak amplitudes are obtained from snapshot 1303 corresponding to local maxima at frequencies of 10 kHz at 1312, 20 kHz at 1322, 30 kHz at 1332, 40 kHz at 1342, 50 kHz at 1352, 60 kHz at 1362, 70 kHz at 1372, and 80 kHz at 1382 respectively.

In some embodiments, once the peak amplitudes are obtained from snapshot 1303 at time T3, snapshot 1302 at time T2, and snapshot 1301 at time T1, a dissipation rate is determined that captures a rate that a peak amplitude at a given frequency is changing over a given time interval (e.g., the time interval between the first and the last snapshot in the plurality of snapshots). One way to determine a dissipation rate for a peak at a given frequency is to fit a line to the points given by the peak amplitudes for the given frequency, which in this case are the points of the peak amplitudes at times T1, T2, and T3. For example, taking the peak amplitude at 30 kHz and tracking the peak amplitude over time, a line can be fit to the points given by peak amplitudes at T1=100 ms (1330), T2=400 ms (1331), and T3=680 ms (1332). The slope of the line fitted to the plot of the peak amplitude for a given frequency over time provides an estimate of a dissipation rate for the peak at the given frequency.

The process described above to determine a dissipation rate of a peak at a given frequency can be applied to any number of snapshots in a plurality of snapshots, wherein each snapshot provides a value for a peak amplitude at a particular point in time.

Figure 14A:
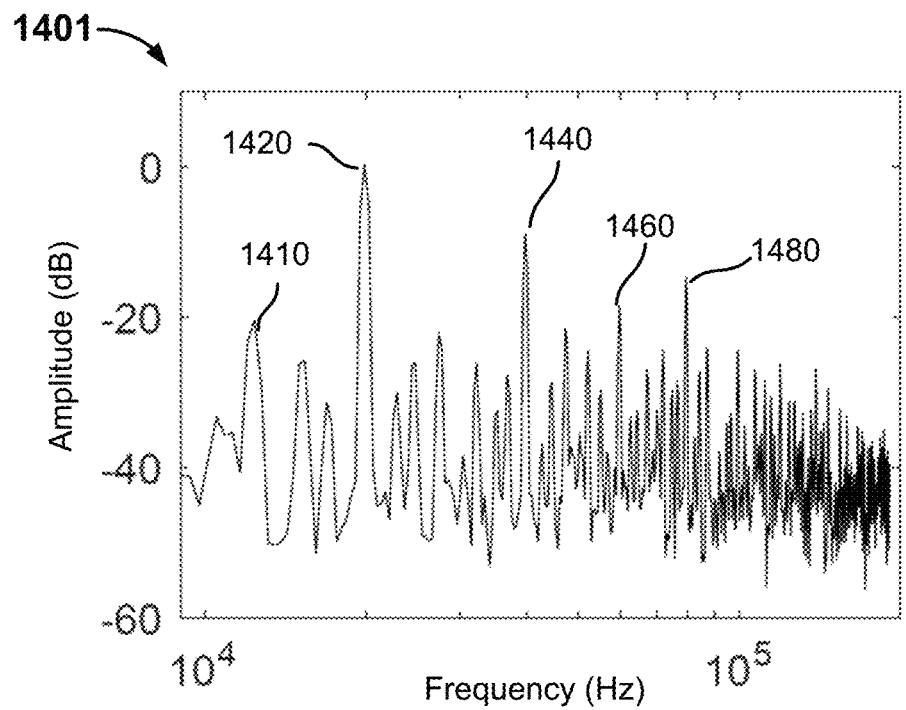
FIG. 14A depicts an embodiment of a first snapshot in a plurality of snapshots obtained at a sequence of times during the welding process for a bad weld.
Figure 14B:
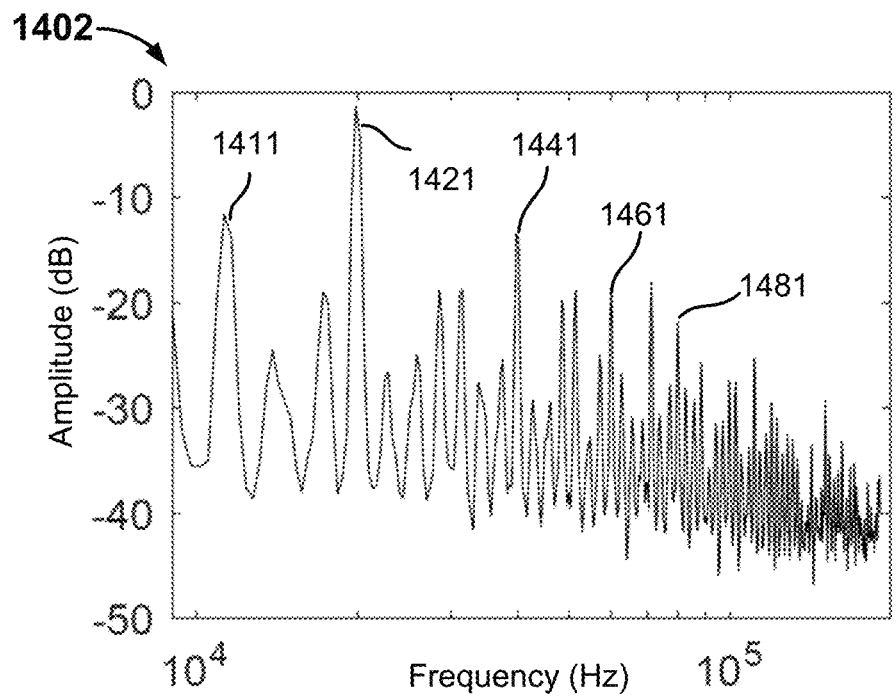
FIG. 14B depicts an embodiment of a second snapshot in a plurality of snapshots obtained at a sequence of times during the welding process for a bad weld.
Figure 14C:
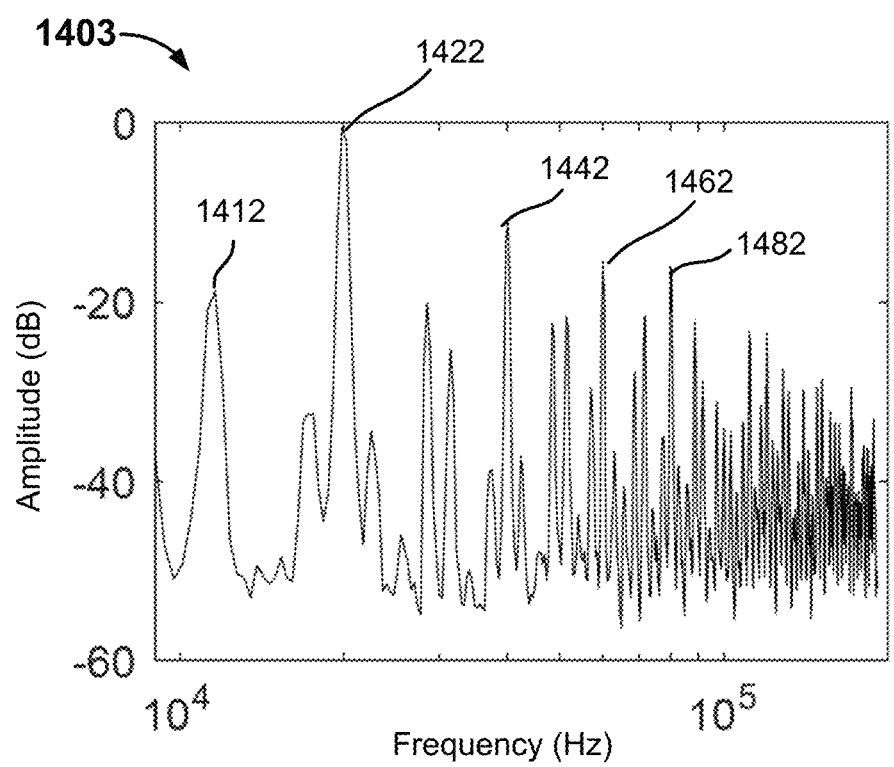
FIG. 14C depicts an embodiment of a third snapshot in a plurality of snapshots obtained at a sequence of times during the welding process for a bad weld.

FIGS. 14A-14C depict an embodiment of a plurality of snapshots obtained at a sequence of times during the welding process for a bad weld, wherein each snapshot in the plurality of snapshots includes a rendering of an audio signal as discussed with respect to step 1210 of FIG. 12.

FIG. 14A depicts an embodiment of a first snapshot 1401 in a plurality of snapshots obtained at a sequence of times during the welding process for a bad weld, the first snapshot 1401 corresponding to a time T1=100 ms after initiating the welding process. As shown in FIG. 14A, once a plurality of peak amplitudes corresponding to a plurality of peaks appearing at a set of frequencies at a time T1 have been determined from snapshot 1401 according to methods described herein, each of the peak amplitudes (as determined for example, by taking a local maximum of each peak at a certain time) is tracked as the weld progresses. As described previously, in the case of a bad weld the set of frequencies where peaks appear (e.g., where peaks have been identified and detected by a peak detector) does not include odd harmonics of half of the excitation frequency of the ultrasonic welder. Accordingly, peak amplitudes are obtained from snapshot 1401 corresponding to local maxima at frequencies of 12 kHz at 1410, 20 kHz at 1420, 40 kHz at 1440, 60 kHz at 1460, and 80 kHz at 1480 respectively.

FIG. 14B depicts an embodiment of a second snapshot 1402 in a plurality of snapshots obtained at a sequence of times during the welding process for a bad weld, the second snapshot 1402 corresponding to a time T2=400 ms after initiating the welding process. Continuing the previous example shown in FIG. 14A, once a plurality of peak amplitudes corresponding to a plurality of peaks appearing at a set of frequencies at a time T1 have been determined from snapshot 1401 according to methods described herein, each of the peak amplitudes at those frequencies (as determined for example, by taking a local maximum of each peak at a certain time) is tracked as the weld progresses. In the example shown, in the case of a bad weld the set of frequencies does not include odd harmonics of half of the excitation frequency of the ultrasonic welder. Accordingly, peak amplitudes obtained from snapshot 1401 corresponding to local maxima at frequencies of 12 kHz, 20 kHz, 40 kHz, 60 kHz, and 80 kHz respectively are tracked in the second snapshot 1402 of FIG. 14B.

In particular, as shown in FIG. 14B, peak amplitudes are obtained from snapshot 1402 corresponding to local maxima at frequencies of 12 kHz at 1411, 20 kHz at 1421, 40 kHz at 1441, 60 kHz at 1461, and 80 kHz at 1481 respectively.

In some embodiments, once the peak amplitudes are obtained from snapshot 1402 at time T2 and snapshot 1401 at time T1, a dissipation rate is determined that captures a rate that a peak amplitude at a given frequency is changing over a given time interval (e.g., the time interval between two snapshots) based on taking a difference between the local maximum of the peak at the given frequency at time T1 and the local maximum of the peak at the given frequency at time T2 and dividing by the time difference T2−T1. For example, a dissipation rate for a peak at 40 kHz is determined by taking a difference between the peak amplitude at 1440 in snapshot 1401 of FIG. 14A and the peak amplitude at 1441 in snapshot 1402 of FIG. 14B divided by the time difference between the two snapshots, T2−T1=400 ms−100 ms=300 ms. This process can be repeated to track a rate of dissipation (or rate of change) for each identified and detected peak over a given time interval (e.g., the time between two snapshots), which in the case of a bad weld are the peaks shown at frequencies of 12 kHz, 20 kHz, 40 kHz, 60 kHz, and 80 kHz respectively.

FIG. 14C depicts an embodiment of a third snapshot 1403 in a plurality of snapshots obtained at a sequence of times during the welding process for a bad weld, the third snapshot 1403 corresponding to a time T3=680 ms after initiating the welding process. Continuing the previous example shown in FIG. 14A, once a plurality of peak amplitudes corresponding to a plurality of peaks appearing at a set of frequencies at a time T1 have been determined from snapshot 1401 according to methods described herein, each of the peak amplitudes at those frequencies (as determined for example, by taking a local maximum of each peak at a certain time) is tracked as the weld progresses. In the example shown, in the case of a bad weld the set of frequencies does not include odd harmonics of half of the excitation frequency of the ultrasonic welder. Accordingly, peak amplitudes obtained from snapshot 1403 corresponding to local maxima at frequencies of 12 kHz, 20 kHz, 40 kHz, 60 kHz, and 80 kHz respectively are tracked in the third snapshot 1403 of FIG. 14C.

In particular, as shown in FIG. 14C, peak amplitudes are obtained from snapshot 1403 corresponding to local maxima at frequencies of 12 kHz at 1412, 20 kHz at 1422, 40 kHz at 1442, 60 kHz at 1462, and 80 kHz at 1482 respectively.

In some embodiments, once the peak amplitudes are obtained from snapshot 1403 at time T3, snapshot 1402 at time T2, and snapshot 1401 at time T1, a dissipation rate is determined that captures a rate that a peak amplitude at a given frequency is changing over a given time interval (e.g., the time interval between the first and the last snapshot in the plurality of snapshots). One way to determine a dissipation rate for a peak at a given frequency is to fit a line to the points given by the peak amplitudes for the given frequency, which in this case are the points of the peak amplitudes at times T1, T2, and T3. For example, taking the peak amplitude at 40 kHz and tracking the peak amplitude over time, a line can be fit to the points given by peak amplitudes at T1=100 ms (1440), T2=400 ms (1441), and T3=680 ms (1442). The slope of the line fitted to the plot of the peak amplitude for a given frequency over time provides an estimate of a dissipation rate for the peak at the given frequency.

The process described above to determine a dissipation rate of a peak at a given frequency can be applied to any number of snapshots in a plurality of snapshots, wherein each snapshot provides a value for a peak amplitude at a particular point in time.

As shown in FIGS. 13A-13C and 14A-14C, a plurality of snapshots obtained at a sequence of times during the welding process are used to extract peak amplitudes at a set of frequencies over time. In the examples shown, the set of frequencies is determined by identifying and detecting peaks at a time T1 according to methods as described herein, including for example, by using a peak detector.

In some embodiments, by tracking a peak amplitude at a given frequency over a time interval, a rate of change of the peak amplitude (e.g., a dissipation rate) is determined that is used to distinguish between a good weld and a bad weld and to determine a metric for weld-quality. The differences exhibited between good and bad welds are used for example in the embodiment of process 1200 of FIG. 12 at step 1220 to determine the quality of a weld for a battery contact by determining a plurality of dissipation rates in response to tracking each of a plurality of peak amplitudes in each of the plurality of snapshots corresponding to a plurality of peaks appearing at a set of frequencies at the sequence of times.

In some examples, a weld-quality indicator for the device being welded is determined in response to dissipation rates determined from a plurality of snapshots obtained during the welding process for a good weld versus a bad weld. For example, the identification and detection of a distinct peak at a set of frequencies that includes odd harmonics of half of the excitation frequency (e.g., frequencies of 30 kHz, 50 kHz and 70 kHz at a time T1=100 ms) that dissipate at a higher rate is indicative of a good weld and conversely, the absence of distinct peaks at this set of frequencies indicates a bad weld. In addition, as shown in FIGS. 14A-14C, the dissipation rates for peaks at harmonics of the excitation frequency (e.g., frequencies of 20 kHz, 40 kHz, 60 kHz, and 80 kHz) are smaller for a bad weld versus a good weld. In other words, distinct peaks for a good weld appear at harmonics of the excitation frequency and at odd harmonics of half of the excitation frequency (as shown in FIG. 13A) but dissipate at a higher rate (as shown in FIGS. 13B-13C). In contrast, distinct peaks for a bad weld appear at harmonics of the excitation frequency but do not appear at odd harmonics of half of the excitation frequency (as shown in FIG. 14A). Moreover, in a bad weld, the amplitude of the detected peaks appears to linger over time, dissipating at a lower rate (as shown in FIGS. 14B-14C) as compared to the peaks for a good weld. Accordingly, a weld-quality indicator is determined in response to identifying and detecting a distinct set of peaks at certain frequencies and tracking the amplitude of the detected peaks over time.

Various methods can be used to determine a weld-quality indicator based at least in part on the extracted features. Such features include for example, a plurality of dissipation rates determined in response to tracking each of a plurality of peak amplitudes in each of the plurality of snapshots corresponding to a plurality of peaks appearing at a set of frequencies at the sequence of times. This is described with respect to step 1220 of FIG. 12 and as depicted in FIGS. 13A-13C and 14A-14C.

For example, an individual dissipation rate determined by tracking each peak amplitude of at a set of specific frequencies (e.g., each of the odd harmonics of half of the excitation frequency of 30 kHz, 50 kHz and 70 kHz respectively) can each be used as a weld-quality indicator and a weld-quality score can be determined by a combination of the weld-quality indicators using a voting scheme or weighted combination of the indicators. Alternatively, the individual dissipation rates determined by tracking peak amplitudes of peaks at a specific frequency (e.g., the odd harmonics of half of the excitation frequency of 30 kHz, 50 kHz and 70 kHz respectively) can be combined to determine a weld-quality indicator for this particular characteristic (i.e., dissipation rates of peaks at odd harmonics of half of the excitation frequency). In some embodiments, the resulting weld-quality indicator is used in combination with other weld-quality indicators (e.g., presence of peaks at odd harmonics of half of the excitation frequency or magnitude of a peak amplitude difference determined for a peak at a specific frequency) for other characteristics as described herein to determine a weld-quality score, the weld-quality score being indicative of a quality of the weld.

Figure 15:
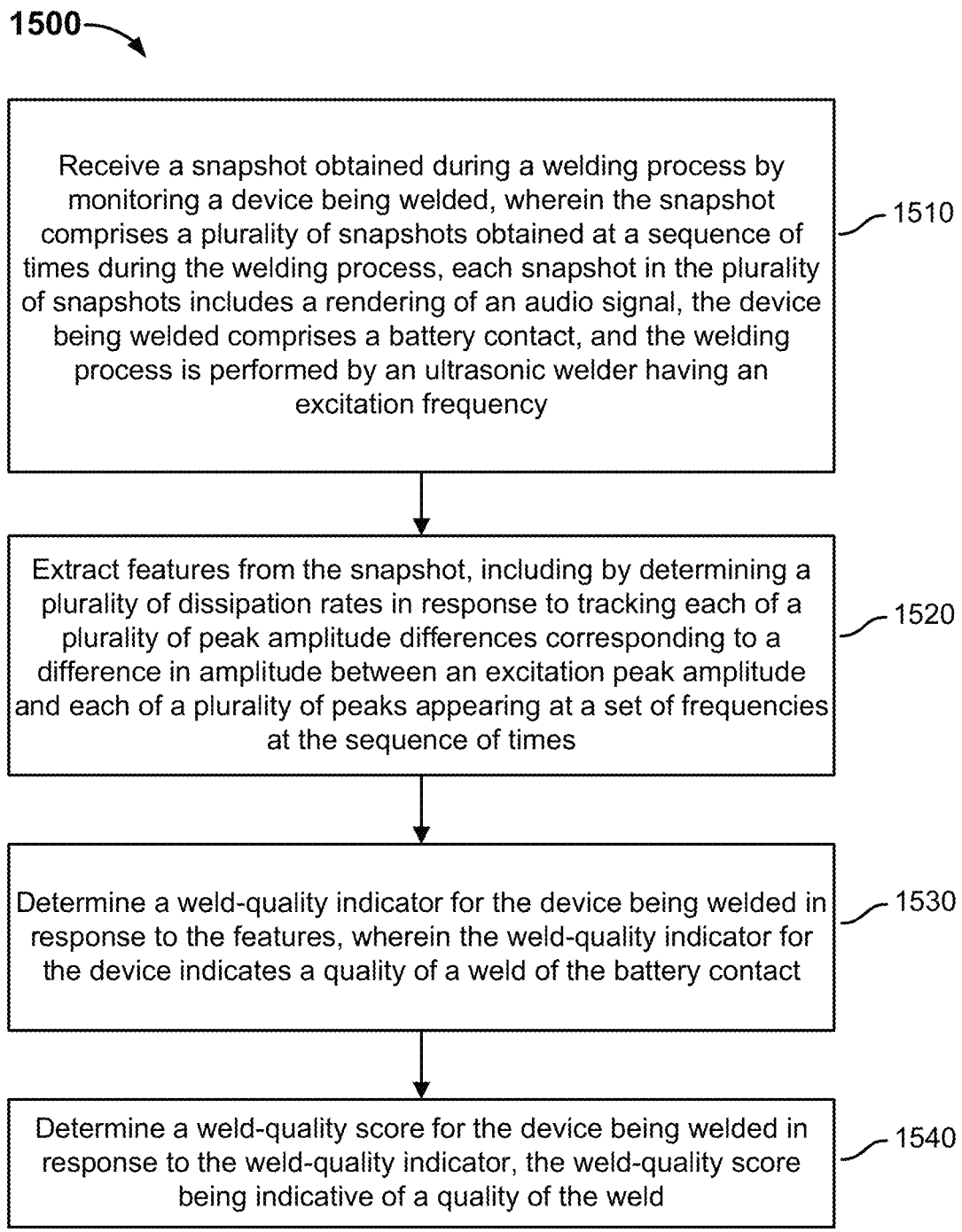
FIG. 15 is a flowchart illustrating an embodiment of a process to determine the quality of a weld for a battery contact using audio signals that includes determining dissipation rates in response to tracking peak amplitude differences in a series of snapshots that include renditions of audio signals.

A process of determining the quality of a weld for a battery contact using audio signals in response to extracting features from a plurality of snapshots to determine differences in the audio signals over time can also be applied to dissipation rates of peak amplitude differences as discussed with respect to FIG. 15. Although FIG. 15 is described with respect to an exemplary system which includes an aluminum tab from a battery cell welded to a copper bus bar, this technique may be applied to a variety of systems.

In particular, FIG. 15 is a flowchart illustrating an embodiment of a process 1500 to determine the quality of a weld for a battery contact using audio signals that includes determining dissipation rates in response to tracking peak amplitude differences in a series of snapshots that include renditions of audio signals.

At 1510, a snapshot obtained during a welding process by monitoring a device being welded is received, wherein the snapshot comprises a plurality of snapshots obtained at a sequence of times during the welding process, each snapshot in the plurality of snapshots includes a rendering of an audio signal, the device being welded comprises a battery contact, and the welding process is performed by an ultrasonic welder having an excitation frequency. Examples of a plurality of snapshots obtained at a sequence of times during the welding process are depicted in FIGS. 13A-13C and 14A-14C. In some examples, the device being welded comprises an aluminum tab connected to a battery cell and a copper bus bar and the welding process is performed by an ultrasonic welder having an excitation frequency to weld the aluminum tab to the copper bus bar.

At 1520, features are extracted from the snapshot, including by determining a plurality of dissipation rates in response to tracking each of a plurality of peak amplitude differences corresponding to a difference in amplitude between an excitation peak amplitude and each of a plurality of peaks appearing at a set of frequencies at the sequence of times.

In other words, first a plurality of peaks appearing at a set of frequencies at a sequence of times are extracted or obtained from a snapshot. A plurality of peak amplitude differences corresponding to a difference in amplitude between an excitation peak amplitude and each of the plurality of peaks is then determined from the snapshot. Next, by obtaining a plurality of snapshots over a sequence of times, each of the plurality of peak amplitude differences is tracked, from which dissipation rates are determined for each of the plurality of peak amplitude differences over the sequence of times.

Note that the process for determining a plurality of dissipation rates in this example is analogous to the process described with respect to FIG. 12 and FIGS. 13A-13C and FIGS. 14A-14C, only instead of obtaining and tracking peak amplitudes at a set of frequencies at a sequence of times, in this case peak amplitude differences are obtained and tracked to determine a rate at which the peak amplitude differences change over time. Thus, once a plurality of peak amplitudes corresponding to a plurality of peaks appearing at a set of frequencies at a time T1 have been determined from a first snapshot (e.g., snapshot 1301 or snapshot 1401) according to methods described herein, each of the peak amplitude differences (e.g., as shown in FIGS. 10 and 11) is tracked as the weld progresses.

At 1530, a weld-quality indicator for the device being welded is determined based at least in part on the features, wherein the weld-quality indicator for the device indicates a quality of a weld of the battery contact. In some examples, where the device being welded comprises an aluminum tab connected to a battery cell and a copper bus bar, the weld-quality indicator for the device indicates a quality of a weld between the aluminum tab and the copper bus bar.

At 1540, a weld-quality score for the device being welded is determined in response to the weld-quality indicator, the weld-quality score being indicative of a quality of the weld.

In some embodiments, a process of determining the quality of a weld for a battery contact using audio signals in response to extracting features from a snapshot includes applying a similarity image algorithm to the snapshot to compare the snapshot with a baseline as discussed in further detail below.

Figure 16:
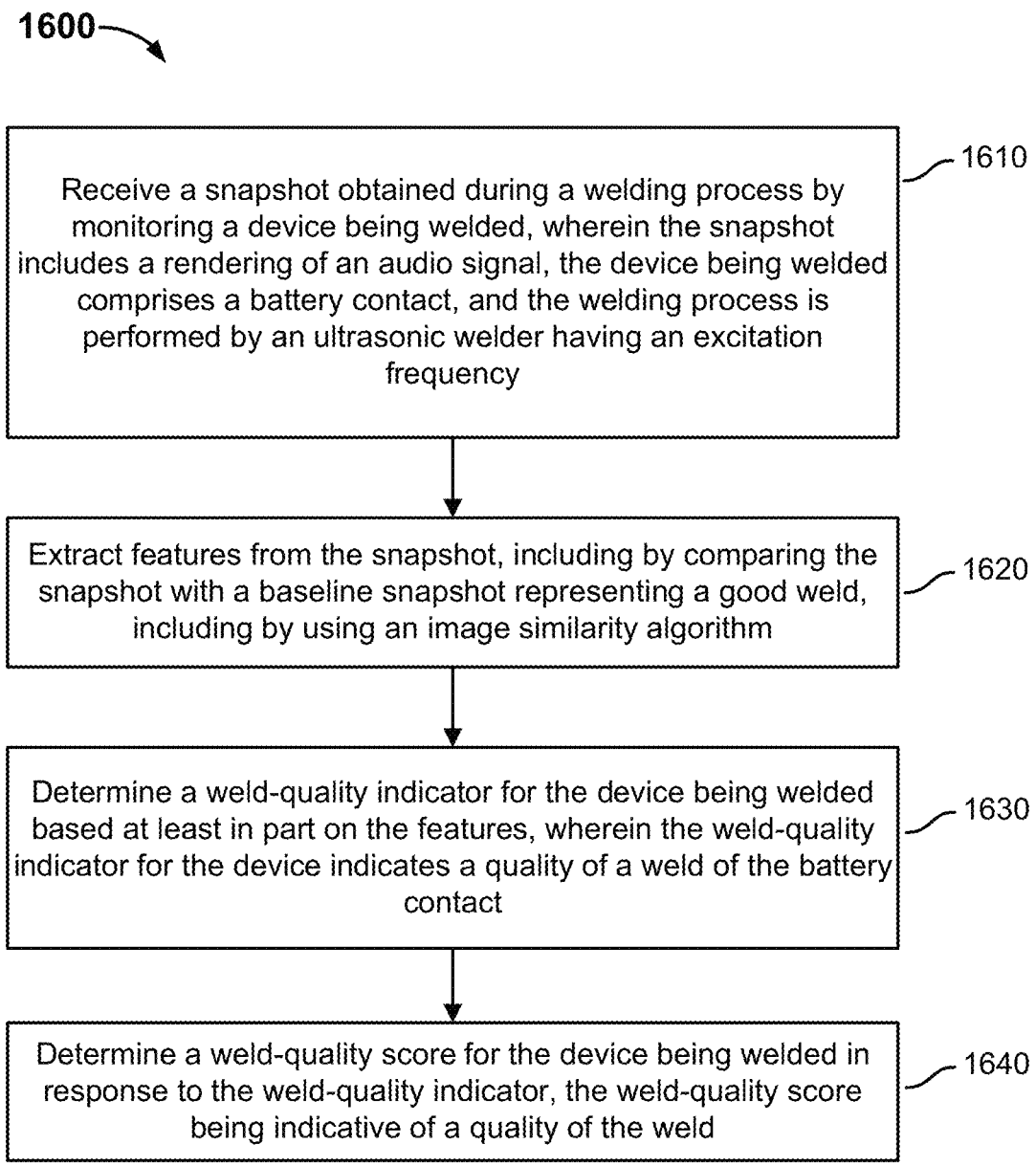
FIG. 16 is a flowchart illustrating an embodiment of a process to determine the quality of a weld for a battery contact using audio signals that includes using a similarity image algorithm.

FIG. 16 is a flowchart illustrating an embodiment of a process 1600 to determine the quality of a weld for a battery contact using audio signals that includes using a similarity image algorithm. As with the other processes described above, this technique may be performed on a variety of systems (e.g., not just a system in which an aluminum tab from a battery cell is welded to a copper bus bar).

At 1610, a snapshot obtained during a welding process by monitoring a device being welded is received, wherein the snapshot includes a rendering of an audio signal, the device being welded comprises a battery contact, and the welding process is performed by an ultrasonic welder having an excitation frequency. In some examples, the device being welded comprises an aluminum tab connected to a battery cell and a copper bus bar and the welding process is performed by an ultrasonic welder having an excitation frequency to weld the aluminum tab to the copper bus bar.

At 1620, features are extracted from the snapshot, including by comparing the snapshot with a baseline snapshot representing a good weld, including by using an image similarity algorithm.

At 1630, a weld-quality indicator for the device being welded is determined based at least in part on the features, wherein the weld-quality indicator for the device indicates a quality of a weld of the battery contact. In some examples, the weld-quality indicator is determined based at least in part on a value obtained by applying an image similarity algorithm, wherein the value indicates how similar the snapshot is to the baseline snapshot. Consequently, the weld-quality indicator for the device indicates a quality of a weld of the battery contact, the quality being better for values indicating a close similarity to the baseline snapshot representing the good weld. In some examples, where the device being welded comprises an aluminum tab connected to a battery cell and a copper bus bar, the weld-quality indicator for the device indicates a quality of a weld between the aluminum tab and the copper bus bar.

At 1640, a weld-quality score for the device being welded is determined in response to the weld-quality indicator, the weld-quality score being indicative of a quality of the weld.

In some examples, the baseline snapshot represents a bad weld and a weld-quality indicator is determined based at least in part on a value obtained by applying an image similarity algorithm to compare a snapshot of the device being welded to the baseline snapshot representing the bad weld. The value obtained indicates how similar the snapshot of the device being welded is to the baseline snapshot of the bad weld. Consequently, the weld-quality indicator for the device indicates a quality of a weld between the aluminum tab and the copper bus bar, the quality being worse for values indicating a close similarity to the baseline snapshot representing the bad weld.

As described previously, various methods can be used to determine a weld-quality indicator based at least in part on extracted features. Such features as described herein include the presence or absence of peaks at odd harmonics of half of the excitation frequency, the magnitude of a peak amplitude difference determined for a peak at a specific frequency or set of frequencies, dissipation rates of a peak amplitude determined for a peak at a specific frequency or set of frequencies, dissipation rates of a peak amplitude difference for a peak at a specific frequency or set of frequencies, and results from comparing the snapshot of the device being welded with a baseline snapshot representing a good or bad weld using a similarity algorithm. In some embodiments, various extracted features are used to determine one or more weld-quality indicators. The one or more weld-quality indicators can be used in individually or in combination (e.g., by combining a plurality of weld-quality indicators into a single weld-quality indicator) in order to determine a weld-quality score for the device being welded, the weld-quality score being indicative of the quality of the weld.

Figure 17:
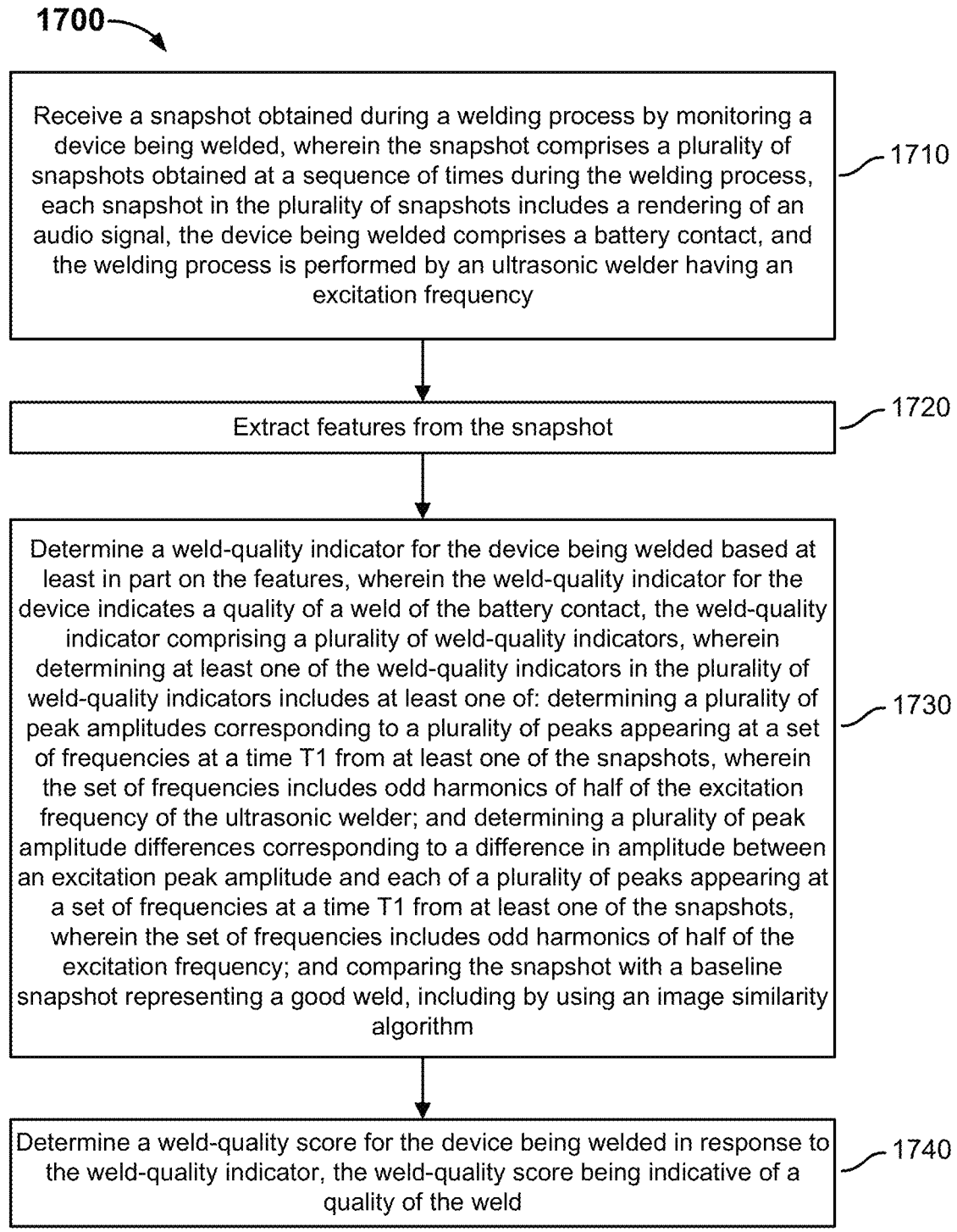
FIG. 17 is a flowchart illustrating an embodiment of a process to determine the quality of a weld for a battery contact using audio signals that includes determining one or more weld-quality indicators based on various extracted features and techniques.

FIG. 17 is a flowchart illustrating an embodiment of a process 1700 to determine the quality of a weld for a battery contact using audio signals that includes determining one or more weld-quality indicators based on various extracted features and techniques. As with the other processes described above, this technique may be performed on a variety of systems (e.g., not just a system in which an aluminum tab from a battery cell is welded to a copper bus bar).

At 1710, a snapshot obtained during a welding process by monitoring a device being welded is received, wherein the snapshot comprises a plurality of snapshots obtained at a sequence of times during the welding process, each snapshot in the plurality of snapshots includes a rendering of an audio signal, the device being welded comprises a battery contact, and the welding process is performed by an ultrasonic welder having an excitation frequency. Examples of a plurality of snapshots obtained at a sequence of times during the welding process are depicted in FIGS. 13A-13C and 14A-14C. In some examples, the device being welded comprises an aluminum tab connected to a battery cell and a copper bus bar and the welding process is performed by an ultrasonic welder having an excitation frequency to weld the aluminum tab to the copper bus bar.

At 1720, features are extracted from the snapshot.

At 1730, a weld-quality indicator for the device being welded is determined based at least in part on the features, wherein the weld-quality indicator for the device indicates a quality of a weld of the battery contact, the weld-quality indicator comprising a plurality of weld-quality indicators, wherein determining at least one of the weld-quality indicators in the plurality of weld-quality indicators includes at least one of: determining a plurality of peak amplitudes corresponding to a plurality of peaks appearing at a set of frequencies at a time T1 from at least one of the snapshots, wherein the set of frequencies includes odd harmonics of half of the excitation frequency of the ultrasonic welder; and determining a plurality of peak amplitude differences corresponding to a difference in amplitude between an excitation peak amplitude and each of a plurality of peaks appearing at a set of frequencies at a time T1 from at least one of the snapshots, wherein the set of frequencies includes odd harmonics of half of the excitation frequency; and comparing the snapshot with a baseline snapshot representing a good weld, including by using an image similarity algorithm. In some examples, where the device being welded comprises an aluminum tab connected to a battery cell and a copper bus bar, the weld-quality indicator for the device indicates a quality of a weld between the aluminum tab and the copper bus bar.

In some embodiments (not shown), the weld-quality indicator comprises a plurality of weld-quality indicators and determining at least one of the weld-quality indicators in the plurality of weld-quality indicators includes at least one of the following: (1) determining a plurality of peak amplitudes corresponding to a plurality of peaks appearing at a set of frequencies at a time T1 from at least one of the snapshots, wherein the set of frequencies includes odd harmonics of half of the excitation frequency; (2) determining a plurality of peak amplitude differences corresponding to a difference in amplitude between an excitation peak amplitude and each of a plurality of peaks appearing at a set of frequencies at a time T1 from at least one of the snapshots, wherein the set of frequencies includes odd harmonics of half of the excitation frequency of the ultrasonic welder; (3) comparing the snapshot with a baseline snapshot representing a good weld, including by using an image similarity algorithm; (4) determining a plurality of dissipation rates in response to tracking each of a plurality of peak amplitudes corresponding to a plurality of peaks appearing at a set of frequencies in each of the plurality of snapshots at the sequence of times; and (5) determining a plurality of dissipation rates in response to tracking each of a plurality of peak amplitude differences corresponding to a difference in amplitude between an excitation peak amplitude and each of a plurality of peaks appearing at a set of frequencies in each of the plurality of snapshots at the sequence of times.

At 1740, a weld-quality score for the device being welded is determined in response to the weld-quality indicator, the weld-quality score being indicative of a quality of the weld.

In some embodiments, a rendering of an audio signal comprises a spectrogram showing an intensity of an audio signal at different frequencies over time as shown in the following figures.

Figure 18:
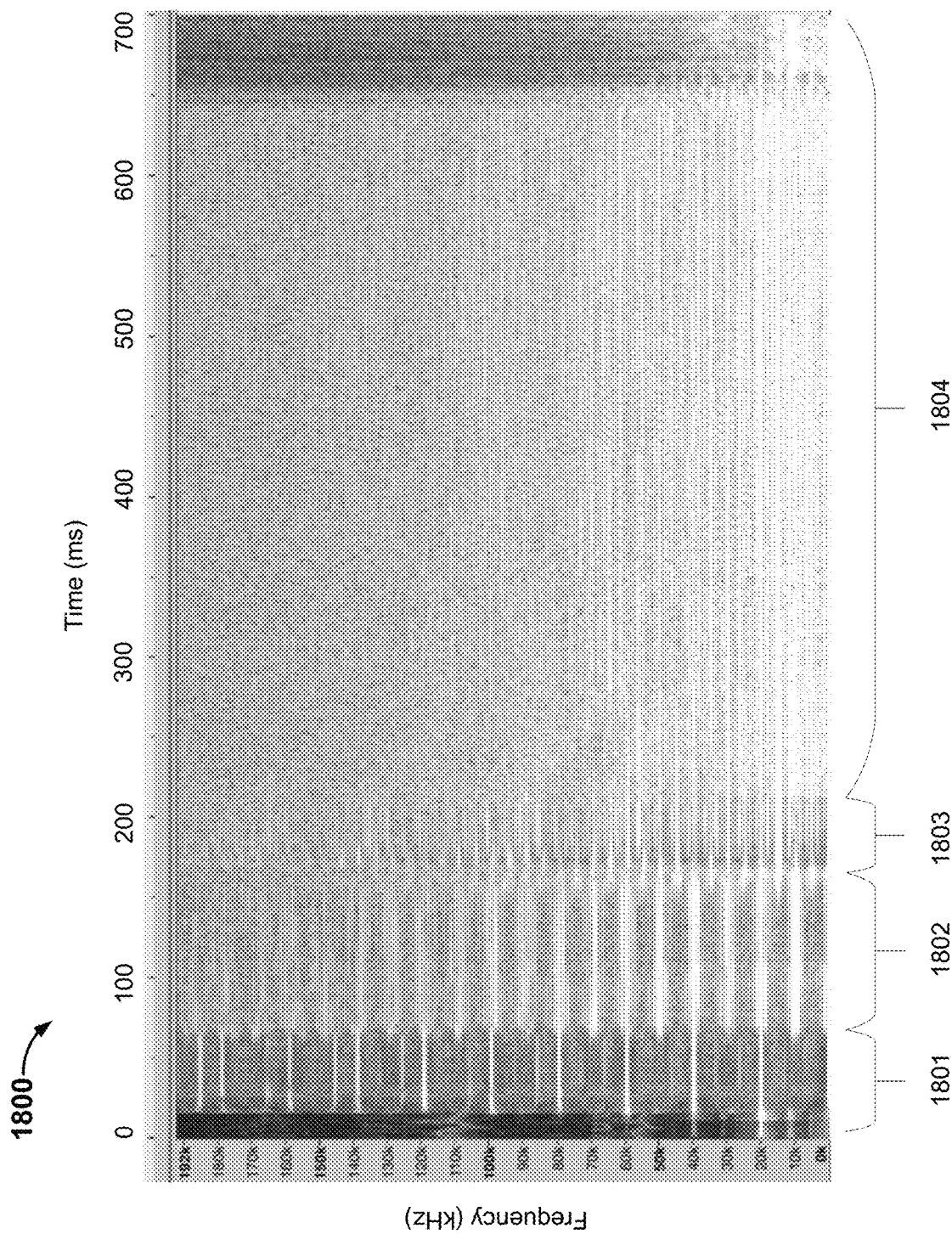
FIG. 18 depicts an embodiment of a spectrogram showing an intensity of an audio signal at different frequencies over time for a good weld.
Figure 19:
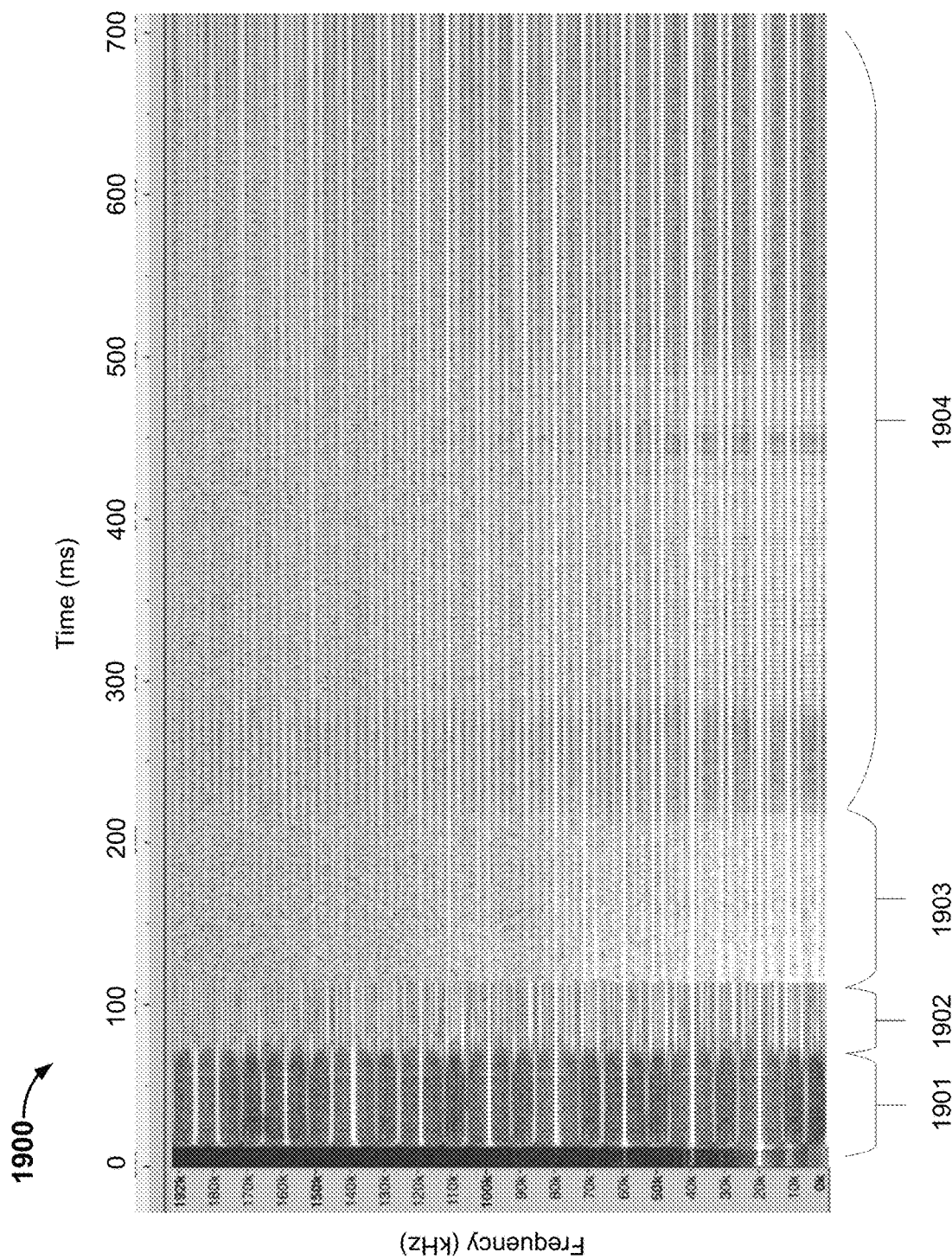
FIG. 19 depicts an embodiment of a spectrogram showing an intensity of an audio signal at different frequencies over time for a bad weld.

FIG. 18 depicts an embodiment of a spectrogram showing an intensity of an audio signal at different frequencies over time for a good weld while FIG. 19 depicts an embodiment of a spectrogram showing an intensity of an audio signal at different frequencies over time for a bad weld.

As can be seen in FIG. 18, a spectrogram 1800 of an audio signal for a good weld plots the intensity of the signal with frequency (kHz) on the y-axis against time (ms) on the x-axis, where $t_0=0$ ms represents the start of the welding process and where lighter or more white areas indicate an increased intensity of the signal over darker more black areas representing a decreased intensity of the signal.

Looking at spectrogram 1800 for a good weld, a first region 1801 shows the intensity of the signal for a good weld between $t_0=0$ ms to $t_1=70$ ms. In this first region 1801, distinct peaks of higher intensity appear at harmonics of the excitation frequency of 20 kHz, depicted in 1800 by the white streaks that appear in region 1801 at frequencies of 20 kHz, 40 kHz, 60 kHz, and 80 kHz respectively. In a second region 1802 defined by a time range between $t_1=70$ ms and $t_2=170$ ms, distinct peaks of higher intensity appear at odd harmonics of half of the excitation frequency of 10 kHz, depicted in 1800 by the white streaks that appear in region 1802 at frequencies of 10 kHz, 30 kHz, 50 kHz, and 70 kHz respectively. In a third region 1803 defined by a time range between $t_2=170$ ms and $t_3=220$ ms the distinct peaks have largely dissipated. In a fourth region 1804 defined by a time range of $t_3=220$ ms to $t_4=700$ ms, there are no visible peaks and the signal is essentially noise.

Turning now to FIG. 19, a spectrogram 1900 of an audio signal for a bad weld plots the intensity of the signal with frequency on the y-axis against time on the x-axis, where $t_0=0$ ms represents the start of the welding process and where lighter or more white areas indicate an increased intensity of the signal over darker more black areas representing a decreased intensity of the signal.

Looking at spectrogram 1900 for a bad weld, a first region 1901 shows the intensity of the signal for a bad weld between $t_0=0$ ms to $t_1=70$ ms. As in the previous example, in this first region 1901, distinct peaks of higher intensity appear at harmonics of the excitation frequency of 20 kHz, depicted in 1900 by the white streaks that appear in region 1801 at frequencies of 20 kHz, 40 kHz, 60 kHz, and 80 kHz respectively. However, unlike the previous example, which exhibited a distinct set of peaks at odd harmonics of half of the excitation frequency of 10 kHz (e.g., 30 kHz, 50 kHz, and 70 kHz), in this case, as shown in a second region 1902 defined here by a time range between $t_1=70$ ms and $t_2=120$ ms, there appear to be several indistinct noisy peaks at various frequencies around the odd harmonics. This result agrees with the snapshots depicted in FIG. 8 (see snapshot 800, regions at 810, 830, 850, and 870 respectively) and FIG. 11 (see snapshot 1100, regions at 1131, 1151, and 1171 respectively). This result also supports that the identification and detection of a distinct peak at a set of frequencies that includes odd harmonics of half of the excitation frequency (e.g., frequencies of 30 kHz, 50 kHz and 70 kHz) that dissipate at a higher rate is indicative of a good weld and conversely, the absence of distinct peaks at this set of frequencies indicates a bad weld.

Another distinction shown by a comparison of FIGS. 18 and 19 is in the subsequent third and fourth regions. In particular, in a third region 1903 defined by a time range between $t_2=120$ ms and $t_3=220$ ms, the peaks that appeared in previous regions 1901 and 1902 remain visible although somewhat dissipated, but nevertheless continue to persist in a fourth region 1904 defined by a time range of $t_3=220$ ms to $t_4=700$ ms. This supports that a further distinction between a good weld and a bad weld is that the peaks detected in a good weld dissipate more quickly (have higher dissipation rates) while the peaks detected in a bad weld dissipate more slowly (have lower dissipation rates) and tend to linger over time.

In some embodiments, spectrograms depicting good welds and bad welds such as those depicted in FIGS. 18 and 19 respectively are used to determine a time T1 for taking an initial snapshot in order to identify and detect peaks in an audio signal that are used in determining a weld-quality indicator. For example, a comparison of the peaks or intensities in the audio signals for a good weld versus a bad weld is performed by analyzing the two spectrograms (e.g., 1800 and 1900) and a time T1 is determined based on or in response to when the peaks or intensities of the two spectrograms begin to diverge or when the two plots diverge significantly. In this case, a comparison of the peaks or intensities between spectrogram 1800 and spectrogram 1900 indicates that divergence starts at a time $t_{d1}=70$ ms and appears to be sustained at least until a point where the peaks of the good weld in spectrogram 1800 begin to dissipate significantly (e.g., at a time $t_{d2}=170$ ms). Accordingly, in this example T1 is selected to be a time between $t_{d1}=70$ ms and $t_{d2}=170$ ms (e.g., T1=100 ms) in order to provide a snapshot for identifying and detecting peaks in an audio signal useful for determining a weld-quality indicator.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining the quality of a weld, the system comprising:
a processor configured to:
receive an input generated in response to sound produced by a welding process that produced a weld, wherein the welding process is performed by an ultrasonic welder having an excitation frequency, wherein the input is indicative of intensity amplitudes of the sound over a range of frequencies including odd harmonics of half the excitation frequency;
process the input to identify features of the sound produced at a time T1, wherein the identified features are based on sound intensity amplitudes and a corresponding set of frequencies of the sound produced at the time T1;
process the identified features of the sound to determine a weld-quality indicator for the weld; and
determine a weld-quality score for the weld based on the weld-quality indicator, wherein the weld-quality score is indicative of a quality of the weld; and
a memory coupled to the processor and configured to provide the processor with instructions.

2. The system recited in claim 1, wherein:
the weld is applied to a battery contact of a device;
identified features of the sound include a plurality of peak intensity amplitudes of the sound; and
the corresponding set of frequencies includes odd harmonics of half of the excitation frequency.

3. The system recited in claim 1, wherein:
the weld is applied to a battery contact of a device;
the identified features of the sound include a plurality of peak intensity amplitude differences, each of the peak intensity amplitude differences corresponding to a difference in intensity amplitude between an excitation peak intensity amplitude and each of a plurality of peak intensity amplitudes of the sound in the corresponding set of frequencies at the time T1; and
the corresponding set of frequencies includes odd harmonics of half of the excitation frequency.

4. The system recited in claim 1, wherein:
the weld is applied to a battery contact of a device;
the input is generated in response to sound produced by the welding process at a plurality of times including the time T1;
the input is indicative of intensity amplitudes of the sound over a range of frequencies including odd harmonics of half the excitation frequency at each of the plurality of times; and
the processor is configured to:
process the input to identify features of the sound produced at each of the plurality of times, wherein the identified features at each of the plurality of times are based on sound intensity amplitudes and a corresponding set of frequencies of the sound produced at the respective time; and
process the identified features of the sound produced at each of the plurality of times to determine the weld-quality indicator for the weld.

5. The system recited in claim 1, wherein:
the weld is applied to a battery contact of a device;
the input is generated in response to sound produced by the welding process at a plurality of times including the time T1;
the input is indicative of intensity amplitudes of the sound over a range of frequencies including odd harmonics of half the excitation frequency at each of the plurality of times; and
the processor is configured to:
process the input to determine peak intensity amplitude dissipation rates of the sound produced by the welding process, wherein each of the peak intensity amplitude dissipation rates is indicative of a rate of decrease in peak intensity amplitude of a respective peak intensity amplitude at a respective frequency over the plurality of times; and
process the peak intensity amplitude dissipation rates to determine the weld-quality indicator for the weld.

6. The system recited in claim 1, wherein:
the weld is applied to a battery contact of a device;
the input is generated in response to sound produced by the welding process at a plurality of times including the time T1;
the input is indicative of intensity amplitudes of the sound over a range of frequencies including odd harmonics of half the excitation frequency at each of the plurality of times; and
the processor is configured to:
process the input to determine dissipation rates of the sound produced by the welding process, wherein each of the dissipation rates corresponds to a difference in intensity amplitude between an excitation peak intensity amplitude and each of a plurality of peak intensity amplitudes of the sound appearing at a set of frequencies at the plurality of times.

7. The system recited in claim 6, wherein the set of frequencies includes odd harmonics of half the excitation frequency.

8. The system recited in claim 1, wherein:
the weld is applied to a battery contact of a device;
the processor is configured to process the input to compare the input with a baseline input generated in response to sound produced by the welding process during the generation of a good weld; and
the processor is configured to compare the input with the baseline input using an image similarity algorithm.

9. The system recited in claim 1, wherein:
the weld is applied to a battery contact of a device;
the weld-quality indicator comprises a plurality of weld-quality indicators, wherein at least one of the plurality of weld-quality indicators is determined from the input in response to at least one of the group consisting of:
a plurality of peak intensity amplitudes corresponding to a plurality of peak intensity amplitudes appearing at a set of frequencies at the time T1, wherein the set of frequencies includes odd harmonics of half of the excitation frequency;
a plurality of peak amplitude differences corresponding to a difference in amplitude between an excitation peak intensity amplitude and each of a plurality of peak intensity amplitudes appearing at a set of frequencies at the time T1, wherein the set of frequencies includes odd harmonics of half of the excitation frequency; and
a comparison of the input with a baseline input generated in response to sound produced by the welding process during the generation of a good weld, wherein the comparison is performed by using an image similarity algorithm.

10. The system recited in claim 1, wherein:
the weld is applied to a battery contact of a device;
the input is generated in response to sound produced by the welding process at a plurality of times including the time T1;
the input is indicative of intensity amplitudes of the sound over a range of frequencies including odd harmonics of half the excitation frequency at each of the plurality of times; and
the weld-quality indicator comprises a plurality of weld-quality indicators, wherein at least one of the plurality of weld-quality indicators is determined in response to at least a plurality of peak intensity amplitudes determined from at least one of the plurality of times, the plurality of peak intensity amplitudes corresponding to a plurality of peak intensity amplitudes appearing at a set of frequencies at a time T1, wherein the set of frequencies includes odd harmonics of half of the excitation frequency.

11. A method for determining the quality of a weld, the method comprising:
receiving an input generated in response to sound produced by a welding process that produced a weld, wherein the welding process is performed by an ultrasonic welder having an excitation frequency, wherein the input is indicative of intensity amplitudes of the sound over a range of frequencies including odd harmonics of half the excitation frequency;
processing the input to identify features of the sound produced at a time T1, wherein the identified features are based on sound intensity amplitudes and a corresponding set of frequencies of the sound produced at the time T1;
processing the identified features of the sound to determine a weld-quality indicator for the weld; and
determining a weld-quality score for the weld based on the weld-quality indicator, wherein the weld-quality score is indicative of a quality of the weld.

12. The method of claim 11 wherein:
the weld is applied to a battery contact of a device; and
the identified features of the sound include a plurality of peak intensity amplitudes of the sound, wherein the corresponding set of frequencies includes odd harmonics of half of the excitation frequency.

13. The method of claim 11 wherein:
the weld is applied to a battery contact of a device;
the identified features of the sound include a plurality of peak intensity amplitude differences, each of the peak intensity amplitude differences corresponding to a difference in intensity amplitude between an excitation peak intensity amplitude and each of a plurality of peak intensity amplitudes of the sound for the corresponding set of frequencies at the time T1; and
the corresponding set of frequencies includes odd harmonics of half of the excitation frequency.

14. The method of claim 11 wherein:
the weld is applied to a battery contact of a device;
the input is generated in response to sound produced by the welding process at a plurality of times including the time T1;
the input is indicative of intensity amplitudes of the sound over a range of frequencies including odd harmonics of half the excitation frequency at each of the plurality of times; and
the input is processed to identify features of the sound produced at each of the plurality of times, wherein the identified features are based on sound intensity amplitudes and a corresponding set of frequencies of the sound produced at the time T1; and
the identified features of the sound produced at each of the plurality of times are processed to determine the weld-quality indicator for the weld.

15. The method of claim 11 wherein:
the weld is applied to a battery contact of a device;
the input is generated in response to sound produced by the welding process at a plurality of times including the time T1;
the input is indicative of intensity amplitudes of the sound over a range of frequencies including odd harmonics of half the excitation frequency at each of the plurality of times; and
the input is processed to determine peak intensity amplitude dissipation rates of the sound produced by the welding process, wherein each of the peak intensity amplitude dissipation rates is indicative of a rate of decrease in peak intensity amplitude of a respective peak intensity amplitude at a respective frequency over the plurality of times; and
the peak intensity amplitude dissipation rates are processed to determine the weld-quality indicator for the weld.

16. The method of claim 11 wherein:
the weld is applied to a battery contact of a device;
the input is generated in response to sound produced by the welding process at a plurality of times including the time T1;
the input is indicative of intensity amplitudes of the sound over a range of frequencies including odd harmonics of half the excitation frequency at each of the plurality of times;
the input is processed to determine dissipation rates of the sound produced by the welding process; and
each of the dissipation rates corresponds to a difference in intensity amplitude between an excitation peak intensity amplitude and each of a plurality of peak intensity amplitudes of the sound appearing at a set of frequencies at the plurality of times.

17. The method of claim 16, wherein the set of frequencies includes odd harmonics of half the excitation frequency.

18. The method of claim 11 wherein:
the weld is applied to a battery contact of a device;
the input is compared with a baseline input generated in response to sound produced by the welding process during the generation of a good weld; and
the input is compared with the baseline input using an image similarity algorithm.

19. The method of claim 11 wherein:
the weld is applied to a battery contact of a device;
the input is generated in response to sound produced by the welding process at a plurality of times including the time T1;
the input is indicative of intensity amplitudes of the sound over a range of frequencies including odd harmonics of half the excitation frequency at each of the plurality of times; and
the weld-quality indicator comprises a plurality of weld-quality indicators, wherein determining at least one of the weld-quality indicators in the plurality of weld-quality indicators includes at least one of:
determining a plurality of peak intensity amplitudes corresponding to a plurality of peak intensity amplitudes appearing at a set of frequencies at a time from at least one of the plurality of times, wherein the set of frequencies includes odd harmonics of half of the excitation frequency;

determining a plurality of peak intensity amplitude differences corresponding to a difference in amplitude between an excitation peak intensity amplitude and each of a plurality of peak intensity amplitudes appearing at a set of frequencies at a time from at least one of the plurality of times, wherein the set of frequencies includes odd harmonics of half of the excitation frequency; and comparing the input with a baseline input generated in response to sound produced by the welding process during the generation of a good weld by using an image similarity algorithm.

20. The method of claim 11 wherein:

the weld is applied to a battery contact of a device;

the input is generated in response to sound produced by the welding process at a plurality of times including the time T1;

the input is indicative of intensity amplitudes of the sound over a range of frequencies including odd harmonics of half the excitation frequency at each of the plurality of times; and the weld-quality indicator comprises a plurality of weld-quality indicators, wherein determining at least one of the weld-quality indicators in the plurality of weld-quality indicators includes at least a plurality of peak intensity amplitude differences corresponding to a difference in amplitude between an excitation peak intensity amplitude and each of a plurality of peak intensity amplitudes appearing at a set of frequencies at a time from at least one of the plurality of times, wherein the set of frequencies includes odd harmonics of half of the excitation frequency.

21. A computer program product for determining the quality of a weld, the computer program product being embodied in a tangible computer readable storage medium and comprising computer instructions for:

receiving an input generated in response to sound produced by a welding process that produced a weld, wherein the welding process is performed by an ultrasonic welder having an excitation frequency, wherein the input is indicative of intensity amplitudes of the sound over a range of frequencies including odd harmonics of half the excitation frequency;

processing the input to identify features of the sound produced at a time T1, wherein the identified features are based on sound intensity amplitudes and a corresponding set of frequencies of the sound produced at the time T1;

processing the identified features of the sound to determine a weld-quality indicator for the weld; and determining a weld-quality score for the weld based on the weld-quality indicator, wherein the weld-quality score is indicative of a quality of the weld.

* * * * *